United States Patent
Oka

(10) Patent No.: US 9,739,450 B2
(45) Date of Patent: Aug. 22, 2017

(54) LIGHT-SOURCE OPTICAL SYSTEM, FIBER LIGHT SOURCE, MICROSCOPE, AND AUTOMOTIVE HEADLIGHT

(71) Applicant: OLYMPUS CORPORATION, Tokyo (JP)

(72) Inventor: Tetsuhiro Oka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/013,437

(22) Filed: Feb. 2, 2016

(65) Prior Publication Data
US 2016/0238216 A1 Aug. 18, 2016

Related U.S. Application Data

(63) Continuation of application No. PCT/JP2014/069145, filed on Jul. 18, 2014.

(30) Foreign Application Priority Data

Aug. 6, 2013 (JP) .................................. 2013-163444
Dec. 26, 2013 (JP) .................................. 2013-269199

(51) Int. Cl.
*F21V 9/16* (2006.01)
*F21V 13/12* (2006.01)
(Continued)

(52) U.S. Cl.
CPC .................. *F21V 9/16* (2013.01); *F21K 9/61* (2016.08); *F21K 9/64* (2016.08); *F21S 48/1225* (2013.01);
(Continued)

(58) Field of Classification Search
CPC ..... F21V 9/16; F21V 9/61; F21V 9/64; F21V 5/04; F21V 7/0025; F21V 7/0033;
(Continued)

(56) References Cited

U.S. PATENT DOCUMENTS

| | | | |
|---|---|---|---|
| 8,506,128 B2* | 8/2013 | Sakata | F21V 7/0025 362/263 |
| 2006/0203497 A1* | 9/2006 | Shimaoka | F21V 7/0025 362/346 |

(Continued)

FOREIGN PATENT DOCUMENTS

| | | |
|---|---|---|
| CN | 102563410 A | 7/2012 |
| CN | 102628573 A | 8/2012 |

(Continued)

OTHER PUBLICATIONS

International Search Report, dated Sep. 22, 2014, issued in corresponding International Application No. PCT/JP2014/069145.

*Primary Examiner* — Mary Ellen Bowman
(74) *Attorney, Agent, or Firm* — Andrews Kurth Kenyon LLP

(57) ABSTRACT

A light-source optical system according to the present invention includes a laser light source that radiates excitation light; a wavelength conversion unit that is irradiated with the excitation light to generate light having a wavelength different from that of the excitation light; and a light deflection and convergence unit that causes an odd number of light beams greater than or equal to three, radiated from the wavelength conversion unit in mutually different directions, to converge at and re-enter the wavelength conversion unit from the backward direction of another light beam, radiated in a direction different from the directions of the odd number of light beams greater than or equal to three, thereby making the odd number of light beams greater than or equal to three overlap the other light beam.

24 Claims, 37 Drawing Sheets

(51) Int. Cl.
*F21V 7/00* (2006.01)
*F21K 9/61* (2016.01)
*F21K 9/64* (2016.01)
*F21V 5/04* (2006.01)
*F21V 13/14* (2006.01)
*F21V 8/00* (2006.01)
*F21S 8/10* (2006.01)
*F21W 101/10* (2006.01)
*F21Y 115/30* (2016.01)
*F21Y 115/10* (2016.01)

(52) U.S. Cl.
CPC ......... *F21S 48/1241* (2013.01); *F21S 48/137* (2013.01); *F21S 48/1323* (2013.01); *F21S 48/1388* (2013.01); *F21V 5/04* (2013.01); *F21V 7/0025* (2013.01); *F21V 7/0033* (2013.01); *F21V 13/12* (2013.01); *F21V 13/14* (2013.01); *G02B 6/0023* (2013.01); *F21S 48/1145* (2013.01); *F21W 2101/10* (2013.01); *F21Y 2115/10* (2016.08); *F21Y 2115/30* (2016.08); *G02B 6/0003* (2013.01); *G02B 6/0006* (2013.01); *G02B 6/0008* (2013.01); *G02B 6/0045* (2013.01); *G02B 6/0055* (2013.01)

(58) Field of Classification Search
CPC ...... F21V 13/12; F21V 13/14; F21S 48/1225; F21S 48/1241; F21S 48/1323; F21S 48/137; F21S 48/1388; G02B 6/0023
See application file for complete search history.

(56) References Cited

U.S. PATENT DOCUMENTS

2011/0148280 A1* 6/2011 Kishimoto ........... F21S 48/1154
  313/483
2015/0369437 A1* 12/2015 Reinprecht ......... F21S 48/1154
  362/510

FOREIGN PATENT DOCUMENTS

| JP | 06-215605 | 8/1994 |
| JP | 2004-134297 | 4/2004 |
| JP | 2009-020537 | 1/2009 |
| JP | 2011-142006 | 7/2011 |
| JP | 2011-222170 | 11/2011 |
| JP | 2012-015001 | 1/2012 |
| JP | 2014-017344 | 1/2014 |

* cited by examiner

LIGHT-SOURCE OPTICAL SYSTEM, FIBER LIGHT SOURCE, MICROSCOPE, AND AUTOMOTIVE HEADLIGHT

CROSS-REFERENCE TO RELATED APPLICATION

This is a continuation of International Application PCT/JP2014/069145, with an international filing date of Jul. 18, 2014, which is hereby incorporated by reference herein in its entirety. This application claims the benefits of Japanese Patent Application No. 2013-163444 filed on Aug. 6, 2013 and Japanese Patent Application No. 2013-269199 filed on Dec. 26, 2013, the contents of which are incorporated herein by reference.

TECHNICAL FIELD

The present invention relates to light-source optical systems for illumination in fiber light sources, microscopes, automotive headlights, etc.

BACKGROUND ART

Light-source units of the type including a light source that generates monochromatic light, such as an LED or a semiconductor laser, and also including a wavelength conversion element that converts the wavelength of the monochromatic light from the light source, such as a phosphor, are known (e.g., see Patent Literature 1). Since wavelength-converted light generated by the wavelength conversion unit is radiated in all directions from the wavelength conversion unit, it is necessary to take some measures in order to increase the output of the light-source unit. According to Patent Literature 1, as an attempt to increase the output of a light-source unit, a reflector is disposed behind a wavelength conversion unit, and light that is scattered backward from the wavelength conversion unit is converged at the wavelength conversion unit by the reflector so as to overlap light that is scattered forward.

Since the light generated by the light-source unit according to Patent Literature 1 has a divergent angle of 180°, the etendue is large. The etendue is defined as $\pi \times$the light-emission area$\times NA^2$. In the case where light having a large etendue is supplied to an optical element having a small etendue, only a portion of the light is supplied to the optical element.

CITATION LIST

Patent Literature

{PTL 1}
Japanese Unexamined Patent Application, Publication No. 2011-142006

SUMMARY OF INVENTION

A first aspect of the present invention is a light-source optical system including a laser light source that radiates excitation light; a wavelength conversion unit that is irradiated with the excitation light from the laser light source to generate light having a wavelength different from that of the excitation light; and a light deflection and convergence unit that causes, of the light generated through the wavelength conversion by the wavelength conversion unit, an odd number of light beams greater than or equal to three, radiated from the wavelength conversion unit in mutually different directions, to converge at and re-enter the wavelength conversion unit from the backward direction of another light beam, radiated from the wavelength conversion unit in a direction different from the directions of the odd number of light beams greater than or equal to three, thereby making the odd number of light beams greater than or equal to three overlap the other light beam, wherein the wavelength conversion unit has a transmittance not less than 60% with respect to the light generated through the wavelength conversion.

A second aspect of the present invention is a light-source optical system including a laser light source that radiates excitation light; a wavelength conversion unit that is irradiated with the excitation light from the laser light source to generate light having a wavelength different from that of the excitation light; and a light deflection and convergence unit that causes, of the light generated through the wavelength conversion by the wavelength conversion unit, three or more light beams radiated from the wavelength conversion unit in mutually different directions to converge at and re-enter the wavelength conversion unit from the backward direction of another light beam, radiated from the wavelength conversion unit in a direction different from the directions of the three or more light beams, thereby making the three or more light beams overlap the other light beam to form a single light beam in which each of the at least four light beams overlaps the other at least three light beams, wherein the wavelength conversion unit has a transmittance not less than 60% with respect to the light generated through the wavelength conversion.

A third aspect of the present invention is a fiber light source including any one of the light-source optical systems described above.

A fourth aspect of the present invention is a microscope including any one of the light-source optical systems described above.

A fifth aspect of the present invention is an automotive headlight including any one of the light-source optical systems described above.

DESCRIPTION OF EMBODIMENTS

First Embodiment

A light-source optical system 100 according to a first embodiment of the present invention will be described below with reference to FIGS. 1 to 12.

Figure 1:
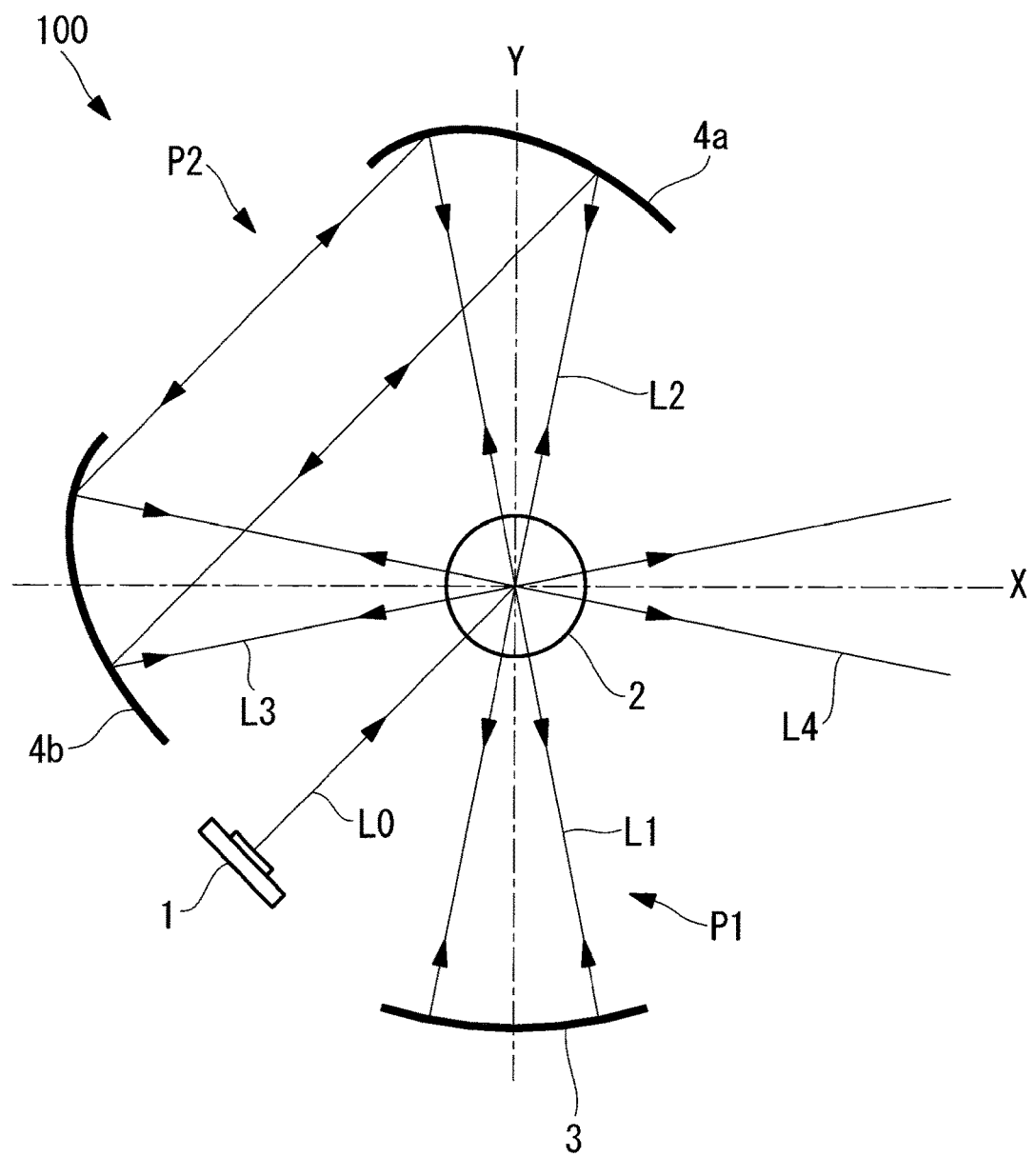
FIG. 1 is an illustration showing the overall configuration of a light-source optical system according to a first embodiment.

As shown in FIG. 1, the light-source optical system 100 according to this embodiment includes a light source 1, a wavelength conversion unit 2 that is irradiated with excitation light L0 radiated from the light source 1 and that generates light having a wavelength different from that of the excitation light L0, and three concave mirrors (light deflection and convergence unit) 3, 4a, and 4b that mutually superimpose, of the light generated through the wavelength conversion (the wavelength-converted light) by the wavelength conversion unit 2, four light beams L1 to L4 radiating in mutually different directions.

The light beams L1 to L4 shown in FIG. 1 are portions of wavelength-converted light generated by the wavelength conversion unit 2 and radiating in all directions, representing only light beams radiated within the effective numerical aperture (NA) of the light-source optical system 100. Since the etendue is a quantity that is conserved from the light source 1 to the irradiated surface, the effective NA of the light-source optical system 100 is determined according to the size of the light emission point of the light-source optical system 100 and the etendue of an optical element located downstream.

For example, a case where an optical fiber is used as the downstream optical element will be considered. Let the light-emission area and effective NA of the light-source optical system 100 be denoted by $S_L$ and $NA_L$, respectively, and the core area and NA of the optical fiber by $S_F$ and $NA_F$, respectively. Then, equation (1) below holds, from which the effective NA of the light-source optical system 100 can be obtained.

$$\pi \times S_L \times NA_L^2 = \pi \times S_F \times NA_F^2 \qquad (1)$$

The effective $NA_L$ represents the maximum angle through which light can enter the downstream optical fiber, and the divergence angles of the light beams L1 to L4 shown in FIG. 1 represent examples of the effective NA. Similarly, the divergence angles of light beams in FIG. 2 and the subsequent figures also represent examples of the effective NA.

Figure 2:
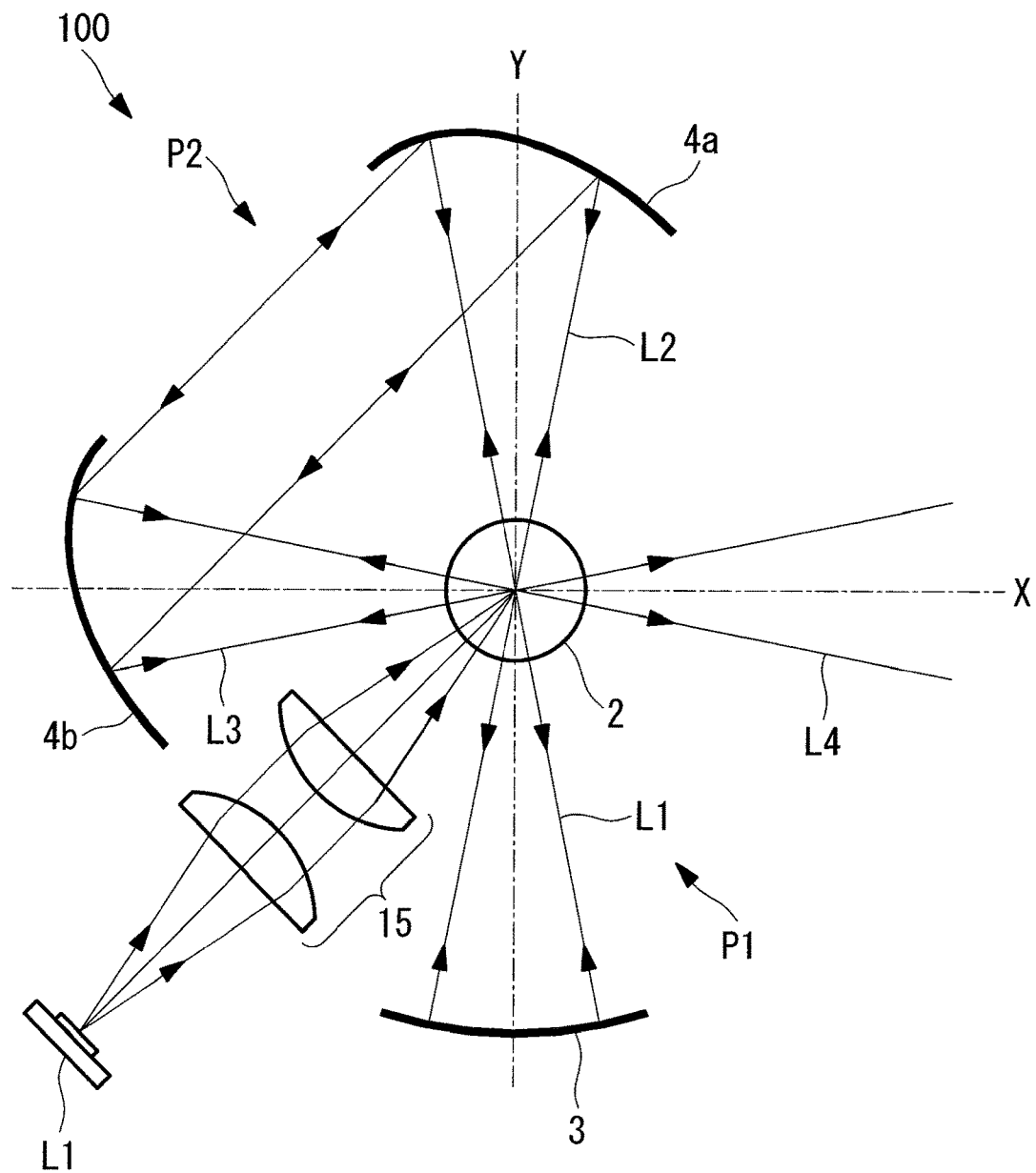
FIG. 2 is an illustration showing the overall configuration of a modification of the light-source optical system shown in FIG. 1.

The light source 1 is a semiconductor light source such as a laser diode (LD) or a light-emitting diode (LED), a gas laser, a solid-state laser, etc. that radiates a highly directional, monochrome beam of light as the excitation light L0. The light source 1 irradiates the wavelength conversion unit 2 with the excitation light L0 from an arbitrary direction. In order to reduce the size of the light emission point of the wavelength-converted light generated by the wavelength conversion unit 2 and to thereby increase the luminance, an excitation-light convergence unit (e.g., a condensing lens) 15 that converges the excitation light L0 to irradiate the wavelength conversion unit 2 with the converged excitation light L0 may be further provided between the light source 1 and the wavelength conversion unit 2, as shown in FIG. 2. This reduces $S_L$ in equation (1), which makes it possible to increase the effective $NA_L$ of light that can enter the downstream optical element, allowing more efficient input of light. Furthermore, laser light has high luminance and directionality, and the convergence diameter of the laser light can be reduced. Accordingly, in the case where a laser light source is used, it is possible to further reduce the size of the light emission point of the wavelength-converted light and to thereby increase the luminance of the light emission point most effectively, which makes the laser light source an ideal light source.

The material of the wavelength conversion unit 2 is, for example, a phosphor, a metal complex, a quantum dot, etc. that is excited with the excitation light L0. When irradiated with the excitation light L0, a phosphor or quantum dot generates fluorescence having a wavelength longer than that of the excitation light L0. Alternatively, the material of the wavelength conversion unit 2 may be xenon gas that is discharged by irradiation with the excitation light L0 to generate white light.

A lamp light source such as a xenon light source using xenon gas requires an electrode for discharge. In contrast, a phosphor or quantum dot does not require any member that blocks light around the light emission point. This enables efficient output of light and allows flexible design of the optical system. Accordingly, a phosphor or quantum dot is preferred as the material of the wavelength conversion unit 2. Moreover, a quantum dot allows adjustment of the absorption wavelength and emission wavelength depending on the particle diameter, material, and structure thereof. This makes it possible to suitably design the light-source optical system 100 for individual applications.

The material of the wavelength conversion unit 2 is held at the center of a spherical container. The wavelength-converted light advances outward from the center in radial directions inside the container and is radiated from the entire outer surface of the container. Here, the wavelength-converted light is radiated from the inside to outside of the container without being refracted at the outer surface of the container. That is, the wavelength-converted light does not experience total reflection at the outer surface of the container. Thus, the wavelength-converted light generated by the wavelength conversion unit 2 is efficiently radiated to the outside of the container. Furthermore, since spherical aberration of the wavelength-converted light is suppressed when the light is radiated to the outside of the container and when the light enters the inside of the container, the condensing efficiency of the wavelength-converted light is improved, which results in an improvement in the usage efficiency of the wavelength-converted light.

The container is made of a material having a transmittance that is sufficiently high for the wavelength-converted light. Furthermore, the material of the wavelength conversion unit 2 also has a transmittance that is sufficiently high for the wavelength-converted light. Thus, the wavelength-converted light is radiated to the outside of the container with a sufficiently high efficiency. Furthermore, as will be described later, when the wavelength-converted light re-enters the wavelength conversion unit 2 via the concave mirrors 3, 4a, and 4b, the wavelength-converted light passes through the wavelength conversion unit 2 with a sufficiently high efficiency. Accordingly, it is possible to increase the amount of light that is finally output.

The three concave mirrors 3, 4a, and 4b are disposed on the X axis and Y axis that pass through the wavelength conversion unit 2 and intersect each other, constituting a first optical path P1 and a second optical path P2. In the drawings that are referred to hereinafter, the center of the wavelength conversion unit 2 is defined as the origin of the X and Y axes, the rightward direction is defined as the positive direction along the X axis, and the upward direction is defined as the positive direction along the Y axis.

The first optical path P1 is a path in which the light beam L1 radiated from the wavelength conversion unit 2 in the negative direction of the Y axis is deflected by 180° and the light beam L1 re-enters the wavelength conversion unit 2 from the negative side along the Y axis. The second optical path P2 is a path in which the light beams L2 and L3 radiated from the wavelength conversion unit 2 in the positive direction of the Y axis and the negative direction of the X axis are deflected and the light beams L2 and L3 re-enter the wavelength conversion unit 2 along the X axis from the negative side and along the Y axis from the positive side, respectively.

With the first optical path P1 and second optical path P2, the three light beams L1, L2, and L3 radiated from the wavelength conversion unit 2 in the positive and negative directions of the Y axis and the negative direction of the X axis all re-enter the wavelength conversion unit 2 from the negative side along the X axis and overlap the light beam L4 radiated from the wavelength conversion unit 2 in the positive direction of the X axis. Accordingly, the four light beams L1, L2, L3, and L4 finally overlap each other and are output in the positive direction of the X axis.

Specifically, the three concave mirrors 3, 4a, and 4b are a spherical mirror 3 and two off-axis parabolic mirrors 4a and 4b. Hereinafter, the off-axis parabolic mirrors 4a and 4b will also be simply referred to as parabolic mirrors 4a and 4b.

The first optical path P1 is formed by the spherical mirror 3. The spherical mirror 3 is disposed on the Y axis such that the center of curvature thereof coincides with the center of the wavelength conversion unit 2. The light beam L1 that has entered the spherical mirror 3 from the wavelength conversion unit 2 along the Y axis is reflected by the spherical mirror 3 and is converged at the wavelength conversion unit 2.

The second optical path P2 is formed by the two parabolic mirrors 4a and 4b that converge parallel light beams that enter along the predetermined axes at focal points. The two parabolic mirrors 4a and 4b are disposed at the negative side on the X axis and the positive side on the Y axis such that the individual focal points thereof coincide with the center of the wavelength conversion unit 2 and such that the axes of parallel light beams coincide with each other. Thus, the light beams L2 and L3 that have entered one of the two parabolic mirrors 4a and 4b from the wavelength conversion unit 2 are converted into parallel light beams and are reflected toward the other and are converged to the wavelength conversion unit 2.

Here, the shapes of the reflecting surfaces of the three mirrors 3, 4a, and 4b are designed so as to receive the light beams L1, L2, and L3 having substantially the same divergence angles and to converge the light beams L1, L2, and L3 at the wavelength conversion unit 2 at convergence angles equal to the divergence angles. Thus, the light beams L1, L2, and L3 that have re-entered the wavelength conversion unit 2 are radiated from the wavelength conversion unit 2 as diverging light beams having substantially the same divergence angles and then overlap the other light beam L4. The etendue that is required for the light-source optical system 100 is determined according to the etendue of the optical element that receives light output from the light-source optical system 100. Therefore, it is also possible to choose, as appropriate, the precision of the positions and the precision of the surface shapes of the three mirrors 3, 4a, and 4b.

Next, the operation of the thus-configured light-source optical system 100 according to this embodiment will be described.

With the light-source optical system 100 according to this embodiment, the excitation light L0 radiated from the light source 1 irradiates the wavelength conversion unit 2, whereby wavelength-converted light generated by the wavelength conversion unit 2 is radiated in all directions. Of the generated wavelength-converted light, the three light beams L1, L2, and L3 radiating in mutually different directions re-enter the wavelength conversion unit 2 via the first optical path P1 and the second optical path P2 formed by the mirrors 3, 4a, and 4b and then overlap the other light beam L4 radiated from the wavelength conversion unit 2. Thus, the light-source optical system 100 outputs the four light beams L1, L2, L3, and L4 radiated in mutually different directions along the X and Y axes such that the light beams L1, L2, L3 and L4 overlap each other.

As described above, according to this embodiment, of the wavelength-converted light generated by the wavelength conversion unit 2, the light beams radiating in four directions are output in an overlapping fashion, which results in an advantage that it is possible to output light having high luminance.

Furthermore, in the case of a configuration in which a light beam backward-scattered by the wavelength conversion unit 2 and having a divergence angle of 180° is output so as to overlap a forward-scattered light beam, as in the case of a reflecting surface denoted by reference sign 6a in Japanese Unexamined Patent Application, Publication No. 2011-142006, the etendue becomes large. In the case where such light is input to an optical element having a small etendue, such as an optical fiber having a small incident area and a small incident angle, it is possible to input only two light beams, namely, a forward light beam (corresponding to the light beam L4 in this embodiment) and a backward light beam (corresponding to the light beam L3 in this embodiment), and most of the generated wavelength-converted light is wasted.

In contrast, according to this embodiment, the four mutually independent light beams L1, L2, L3, and L4 are output in an overlapping fashion. This makes it possible to increase the amount of light while maintaining the etendue equivalent to that of each of the light beams L1, L2, L3, and L4. That is, it is possible to utilize a portion of light that is wasted according to Japanese Unexamined Patent Application, Publication No. 2011-142006. Therefore, an advantage is afforded in that it is possible to supply light efficiently even to an optical element having a small etendue.

Furthermore, according to this embodiment, the spot diameter at the time of convergence of the light beams L1, L2, L3, and L4 at the wavelength conversion unit 2 via the mirrors 3, 4a, and 4b is equal to that at the time of radiation from the wavelength conversion unit 2, and the light beams L1, L2, L3, and L4 are output in a uniformly overlapping fashion. Thus, it is possible to efficiently input light to a downstream optical element.

Furthermore, according to this embodiment, since the reflection by the mirrors 3, 4a, and 4b is utilized in order to deflect and converge wavelength-converted light, an advantage is afforded in that the occurrence of chromatic aberration is suppressed, which eliminates the need to consider chromatic aberration in the design.

Furthermore, in the case where a phosphor or quantum dot is used as the material of the wavelength conversion unit 2, no member that blocks light is provided in the wavelength conversion unit 2. Thus, it is possible to efficiently output the generated wavelength-converted light, and the flexibility of design is also improved. Since the wavelength conversion unit 2 has a sufficiently high transmittance for wavelength-converted light, as described earlier, it is possible to increase the luminance of output light by causing wavelength-converted light to re-enter the wavelength conversion unit 2, and it is also possible to suppress degradation of the wavelength conversion unit 2 caused by the re-entered light.

In contrast, for example, with a lamp light source such as a xenon lamp, an electrode for discharging is required, so that the flexibility of the design of an optical system is low. Furthermore, when emitted light re-enters the light emission point as in this embodiment, there is a risk of a reduction in life due to wear of the electrode. Therefore, it is difficult to increase the luminance by causing the emitted light to re-enter the light emission point.

According to this embodiment, it is possible to generate light having high luminance, so that the embodiment is suitable as illumination for a fiber light source, a microscope, an automotive headlight, etc.

Although the concave mirrors 3, 4a, and 4b that have functions of both deflection and convergence are used as the light deflection and convergence unit in this embodiment, alternatively, mutually separate optical components may be used, as shown in FIGS. 3 to 12.

Figure 3:
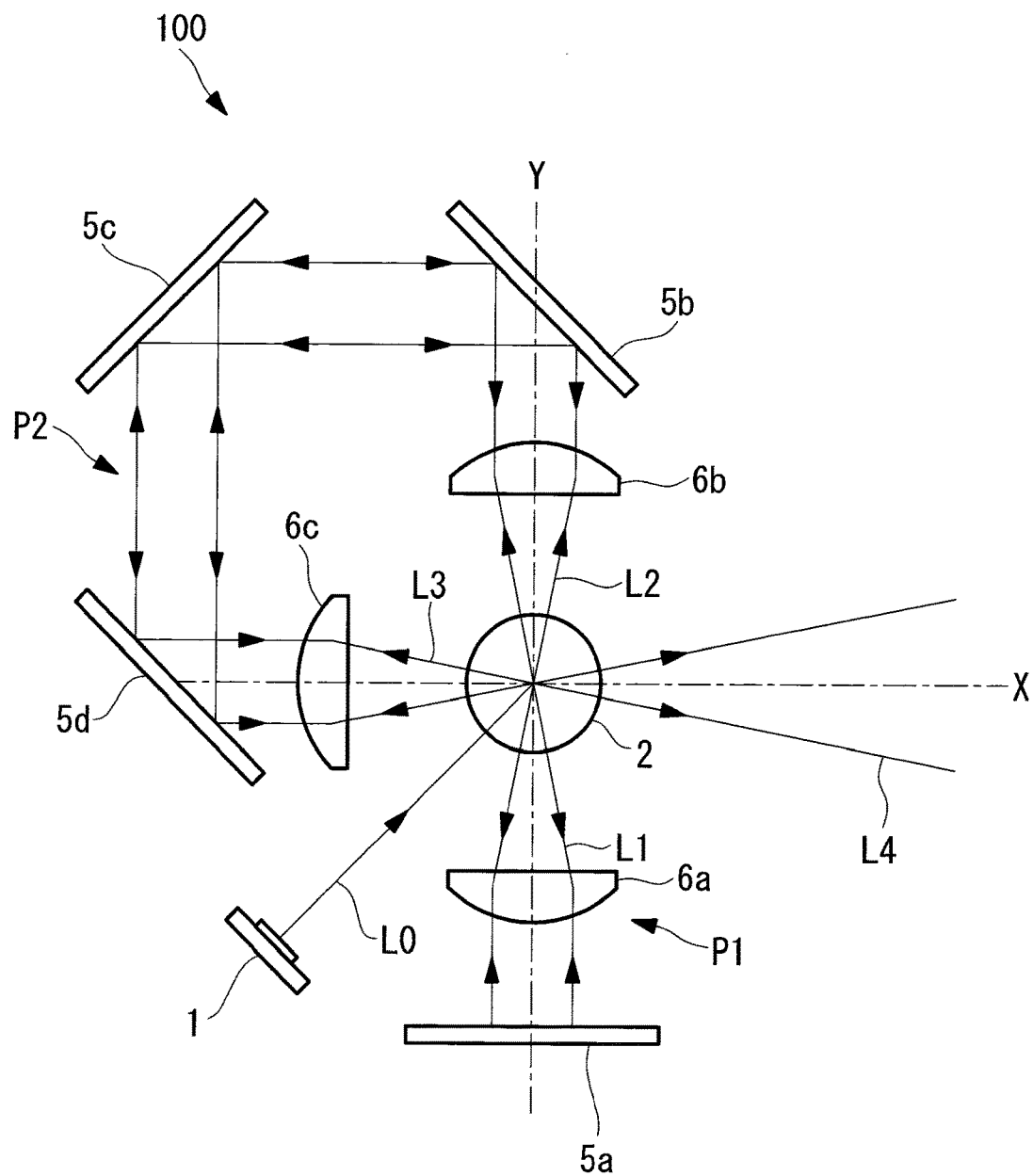
FIG. 3 is an illustration showing the overall configuration of another modification of the light-source optical system shown in FIG. 1.

FIG. 3 shows a modification in which flat mirrors 5a, 5b, 5c, and 5d having a deflection function and convex lenses (optical systems having a positive refractive power) 6a, 6b, and 6c having a convergence function are used.

The one flat mirror 5a forms a first optical path P1 and deflects the light beam L1 by 180°. The three flat mirrors 5b, 5c, and 5d form a second optical path P2 and deflect the light beams L2 and L3 such that the optical axes of the light beams L2 and L3 overlap each other.

The convex lenses 6a, 6b, and 6c are disposed between the wavelength conversion unit 2 and the flat mirrors 5a, 5b, and 5d such that the focal points thereof coincide with the center of the wavelength conversion unit 2. The convex lenses 6a, 6b, and 6c convert the light beams L1, L2, and L3 radiated from the wavelength conversion unit 2 individually into parallel light beams and radiate the parallel light beams toward the flat mirrors 5a, 5b, and 5d and also converge the light beams L1, L2, and L3 reflected by the flat mirrors 5a, 5b, and 5d at the wavelength conversion unit 2.

By converting the light beams L1, L2, and L3 into parallel light beams and then deflecting the parallel light beams by using the flat mirrors 5a, 5b, 5c, and 5d, as described above, it is possible to relax the requirement for the alignment precision of the individual optical elements.

Furthermore, although the three flat mirrors 5b, 5c, and 5d are used to deflect the light beams L2 and L3 in the configuration described above, alternatively, the configuration may be such that the optical axes of the light beams L2 and L3 are made to overlap each other by using only the two flat mirrors 5b and 5d, or four or more flat mirrors may be used.

Figure 4:
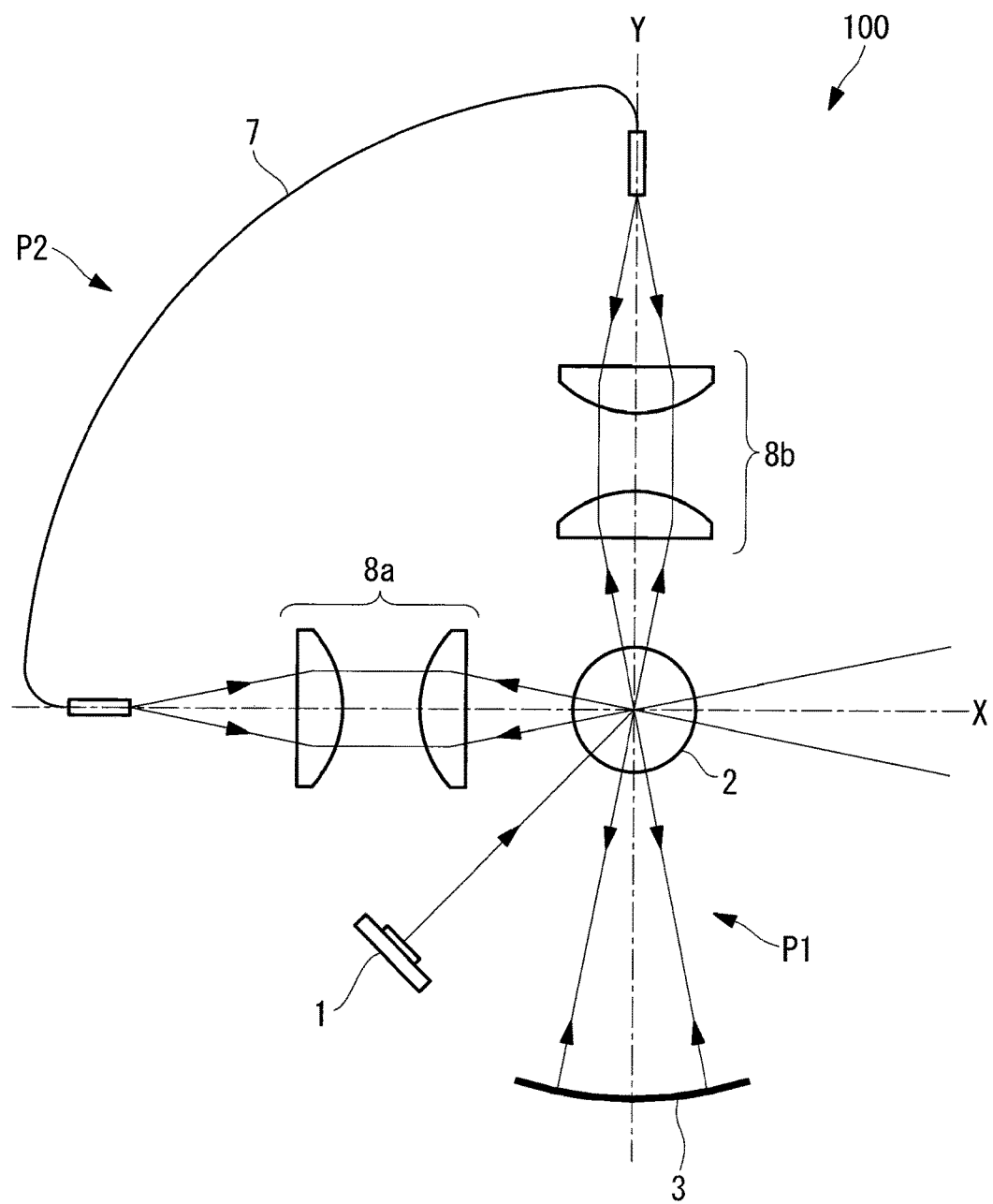
FIG. 4 is an illustration showing the overall configuration of another modification of the light-source optical system shown in FIG. 1.

FIG. 4 shows a modification in which an optical fiber (light-guide element) 7 having a deflection function and lens pairs 8a and 8b having a convergence function are used instead of the parabolic mirrors 4a and 4b shown in FIG. 1.

For example, each of the lens pairs 8a and 8b is constituted of two convex lenses disposed with the convex faces thereof facing each other and has two focal points on either side. Each of the lens pairs 8a and 8b is disposed such that the focal point of one of the lenses thereof coincides with the center of the wavelength conversion unit 2. The two end faces of an optical fiber 7 are disposed at the other focal points of the lens pairs 8a and 8b. The optical fiber 7 guides a light beam radiated from one of the two lens pairs 8a and 8b into the other.

By using the optical fiber 7 as described above, it is possible to arbitrarily change the path along which a light beam is deflected between the X axis and the Y axis. This makes it possible to reduce the size of the system as a whole.

In the modification shown in FIG. 3, a retroreflective element (e.g., a corner cube) may be used instead of the flat mirror 5a. This makes it possible to further relax the requirement for the alignment precision of the retroreflective element.

Furthermore, in the modification shown in FIG. 4, a combination of the flat mirror 5a and the convex lens 6a shown in FIG. 3 or a combination of a retroreflective element and the convex lens 6a may be used instead of the spherical mirror 3.

Figure 5:
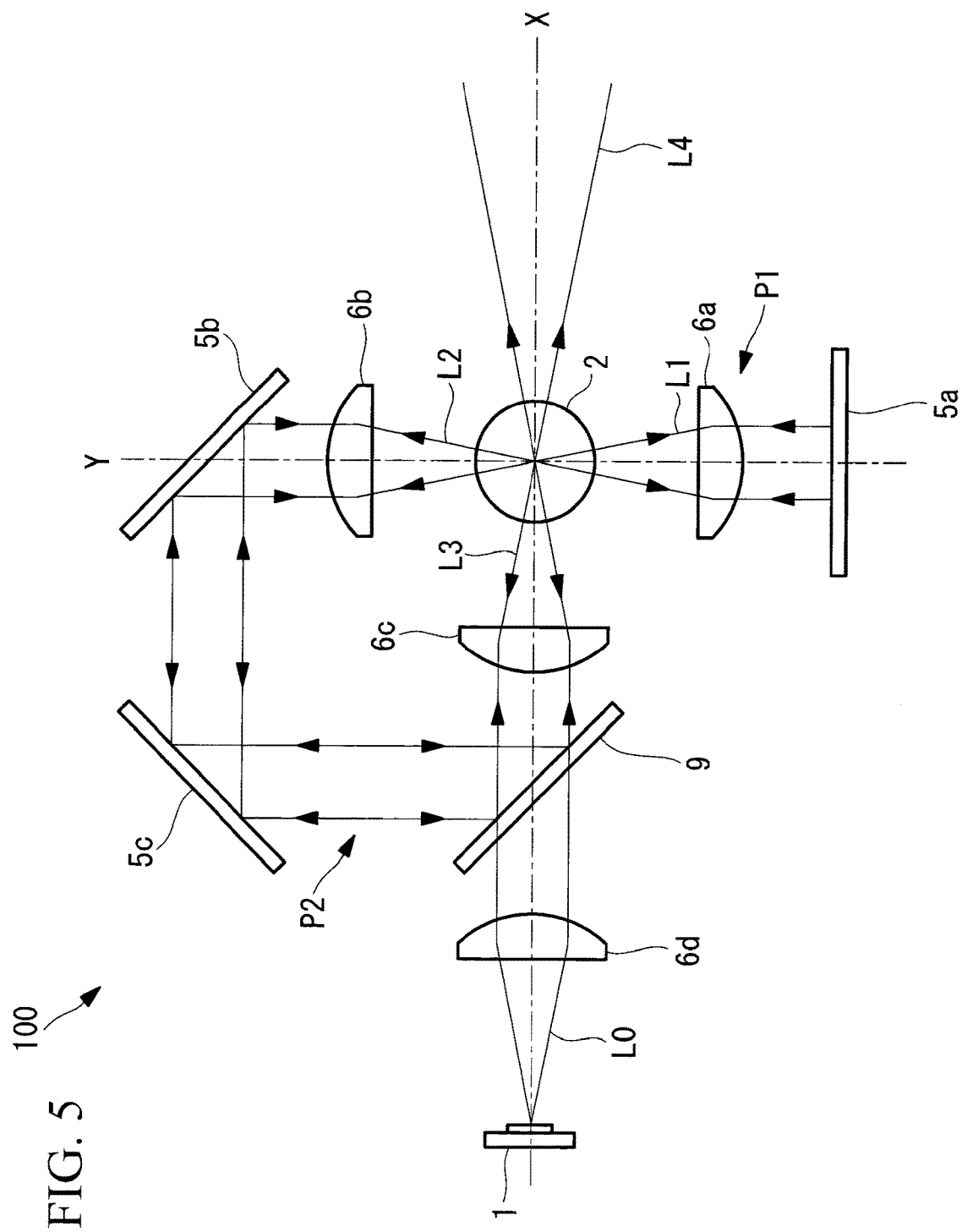
FIG. 5 is an illustration showing the overall configuration of another modification of the light-source optical system shown in FIG. 1.

The configuration shown in FIG. 5 is a modification of the configuration shown in FIG. 3. In this configuration, a dichroic mirror 9 is provided. The dichroic mirror 9 has optical characteristics such that the excitation light L0 is transmitted whereas wavelength-converted light is reflected. The dichroic mirror 9 overlaps the excitation light L0 from the light source 1 with one of the four light beams L1, L2, L3, and L4. A convex lens 6d converts the excitation light L0 radiated as a diverging light beam from the light source 1 into a collimated light beam.

In the configuration shown in FIG. 5, the flat mirror 5d disposed on the negative side of the X axis in FIG. 3 is replaced with the dichroic mirror 9, and the excitation light L0 from the light source 1 enters the dichroic mirror 9 along the X axis.

By unifying the optical path of the excitation light L0 and the optical path of the light beam L3 as described above, an advantage is afforded in that it is possible to reduce the size of the system as a whole.

Figure 6:
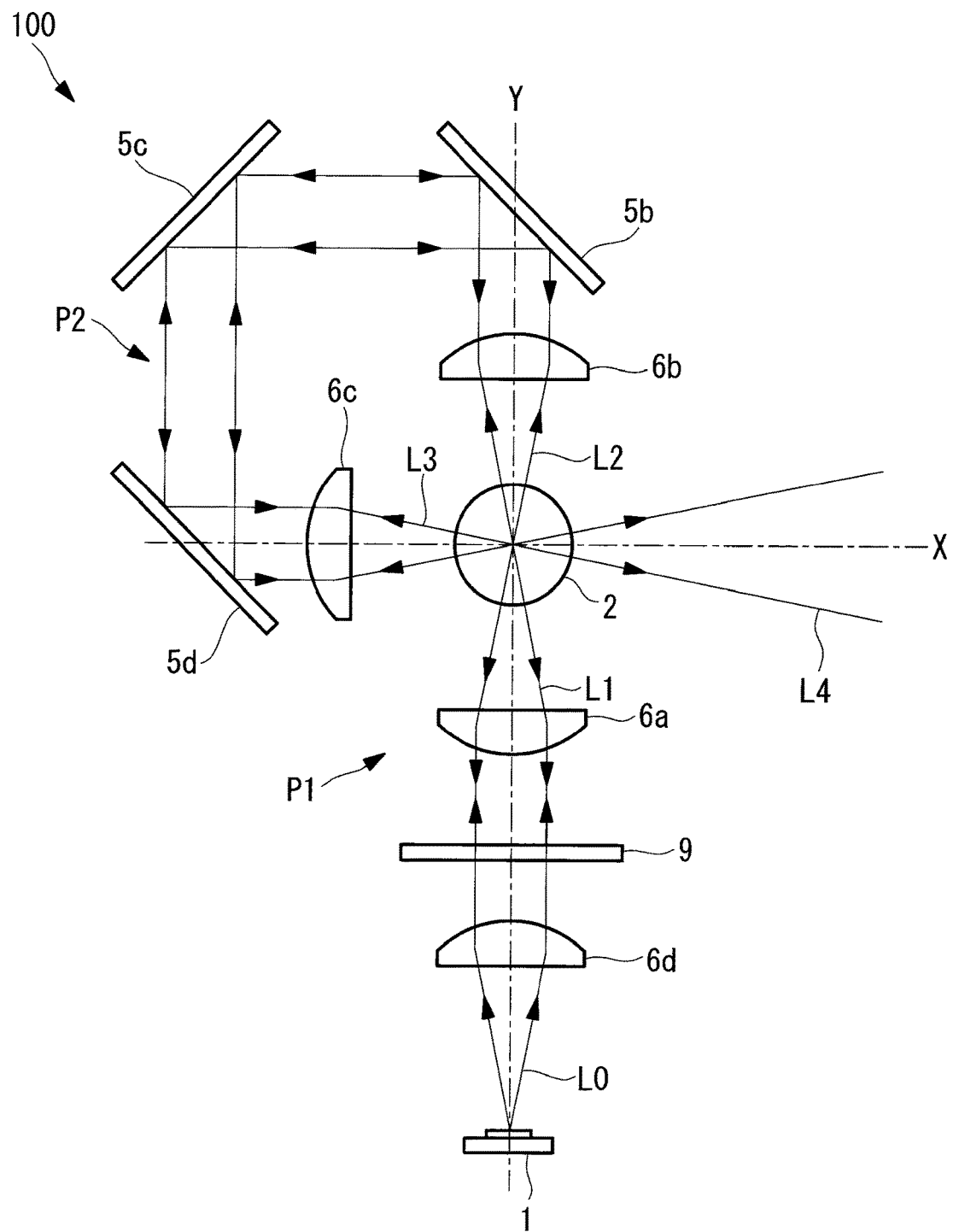
FIG. 6 is an illustration showing the overall configuration of another modification of the light-source optical system shown in FIG. 1.
Figure 8:
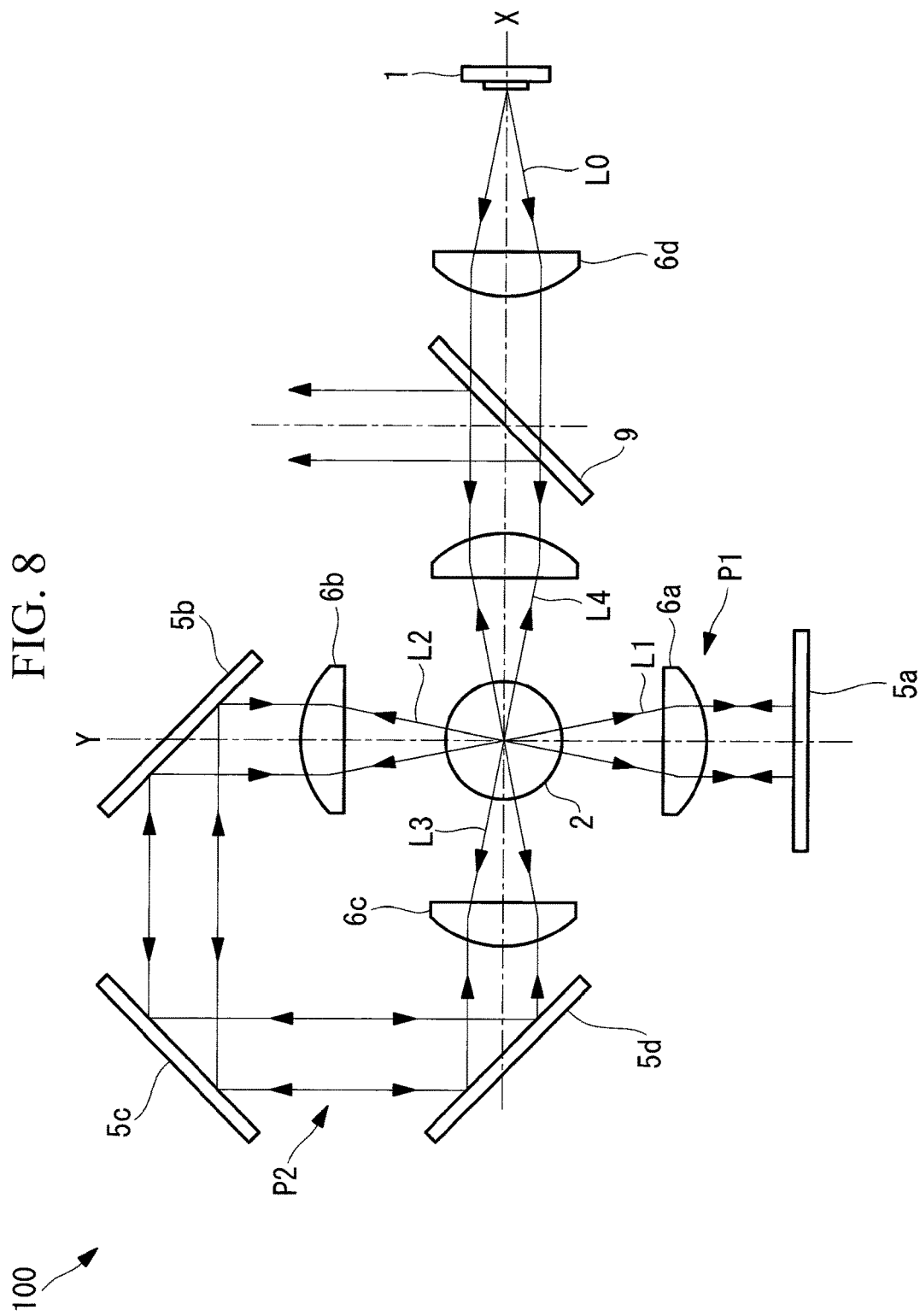
FIG. 8 is an illustration showing the overall configuration of another modification of the light-source optical system shown in FIG. 1.

Furthermore, the placement of the light source 1 and the dichroic mirror may be modified from that shown in FIG. 6 to that shown in FIG. 8.

Figure 7:
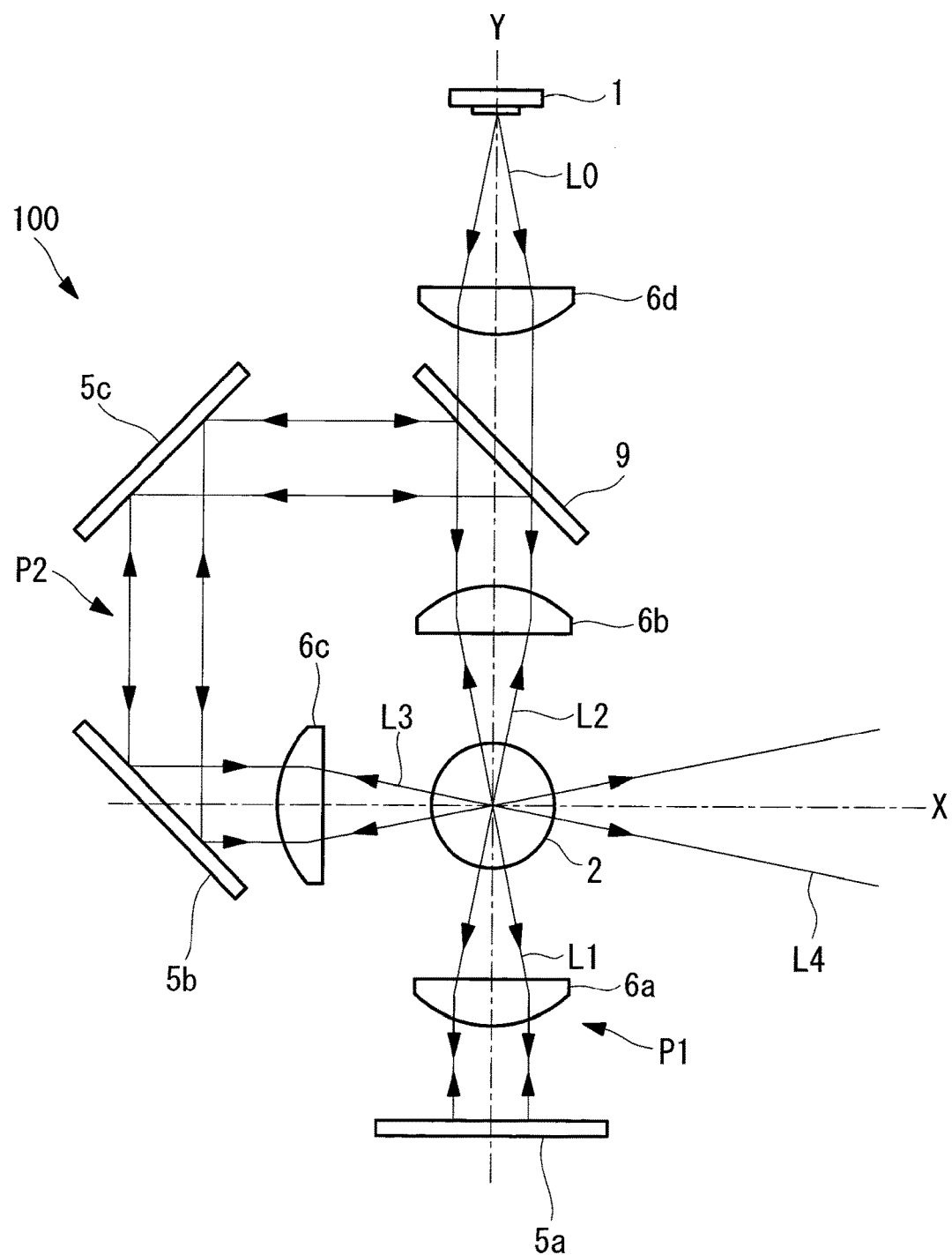
FIG. 7 is an illustration showing the overall configuration of another modification of the light-source optical system shown in FIG. 1.

FIG. 6 shows a modification in which the flat mirror 5a shown in FIG. 3 is replaced with the dichroic mirror 9. FIG. 7 shows a modification in which the flat mirror 5b shown in FIG. 3 is replaced with the dichroic mirror 9. Alternatively, as shown in FIG. 8, the dichroic mirror 9 may be disposed on the positive side of the X axis to deflect the output light laterally with respect to the X axis.

The excitation light L0 that has entered the wavelength conversion unit 2 is not entirely subjected to the wavelength conversion by the wavelength conversion unit 2, and a portion of the excitation light L0 passes through the wavelength conversion unit 2 without being subjected to the wavelength conversion. When the position of the dichroic mirror 9 is modified as shown in FIGS. 6 to 8, the excitation light L0 radiated from the light source 1 passes through the wavelength conversion unit 2 twice or more. Specifically, the excitation light L0 passes through the wavelength conversion unit 2 twice in the configurations shown in FIGS. 6 and 7 and four times in the configuration shown in FIG. 8. Thus, the portion of the excitation light L0 that has passed through the wavelength conversion unit 2 without being subjected to the wavelength conversion re-enters the wavelength conversion unit 2, whereby the ratio of the excitation light L0 that is subjected to the wavelength conversion increases. This makes it possible to output light having even higher luminance.

Figure 9:
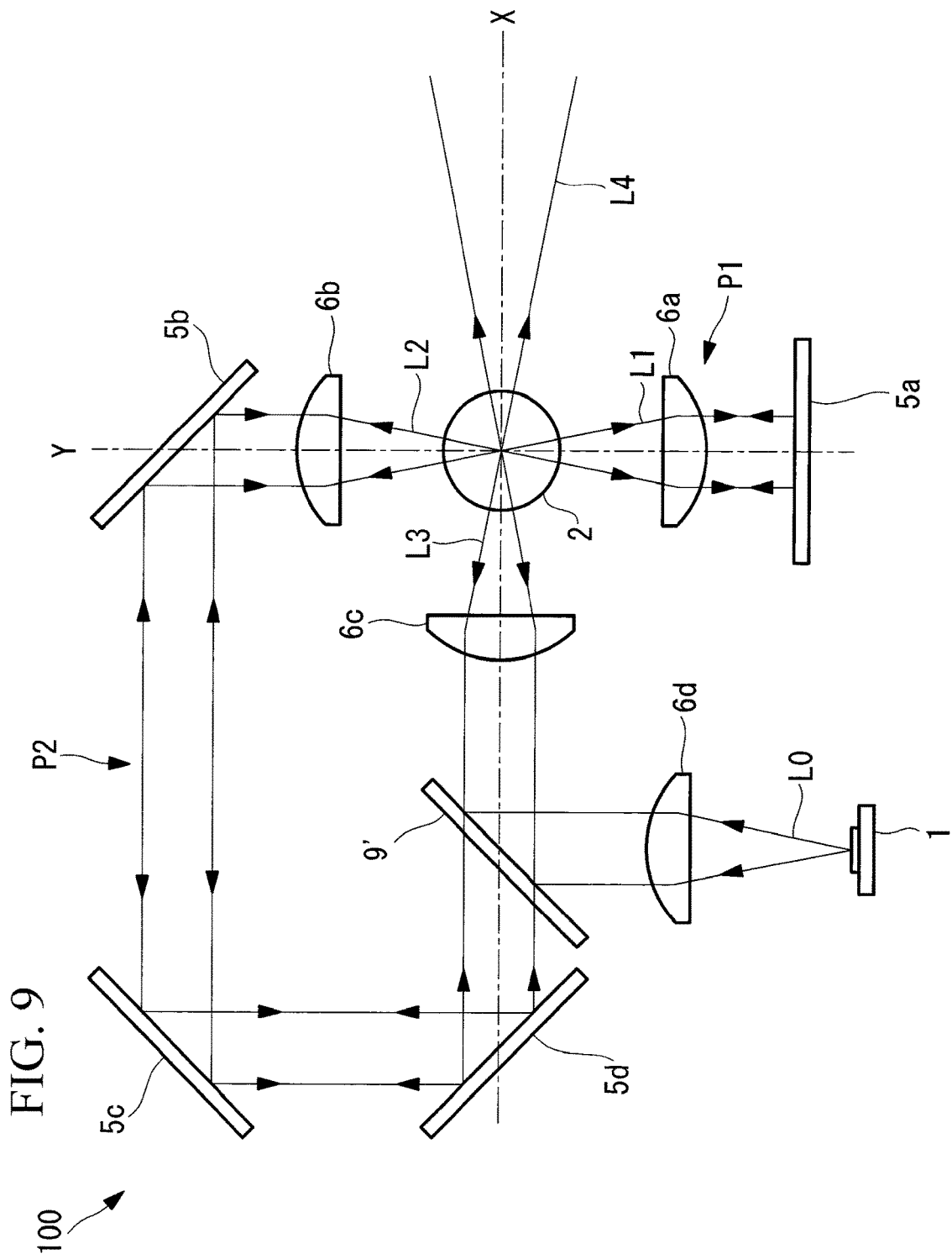
FIG. 9 is an illustration showing the overall configuration of another modification of the light-source optical system shown in FIG. 1.

FIG. 9 shows an example configuration in which a dichroic mirror 9' having optical characteristics such that the excitation light L0 is reflected whereas wavelength-converted light is transmitted is used.

In the configuration shown in FIG. 9, the dichroic mirror 9' is disposed between the wavelength conversion unit 2 and the flat mirror 5d disposed on the negative side of the X axis. The dichroic mirror 9' is disposed at an inclination with respect to the X axis and deflects the excitation light L0 from the light source 1, entered as a collimated beam of light, so that the excitation light L0 overlaps the X axis.

By unifying the optical path of the excitation light L0 and the optical path of the light beam L3, it is possible to reduce the size of the system as a whole.

Figure 10:
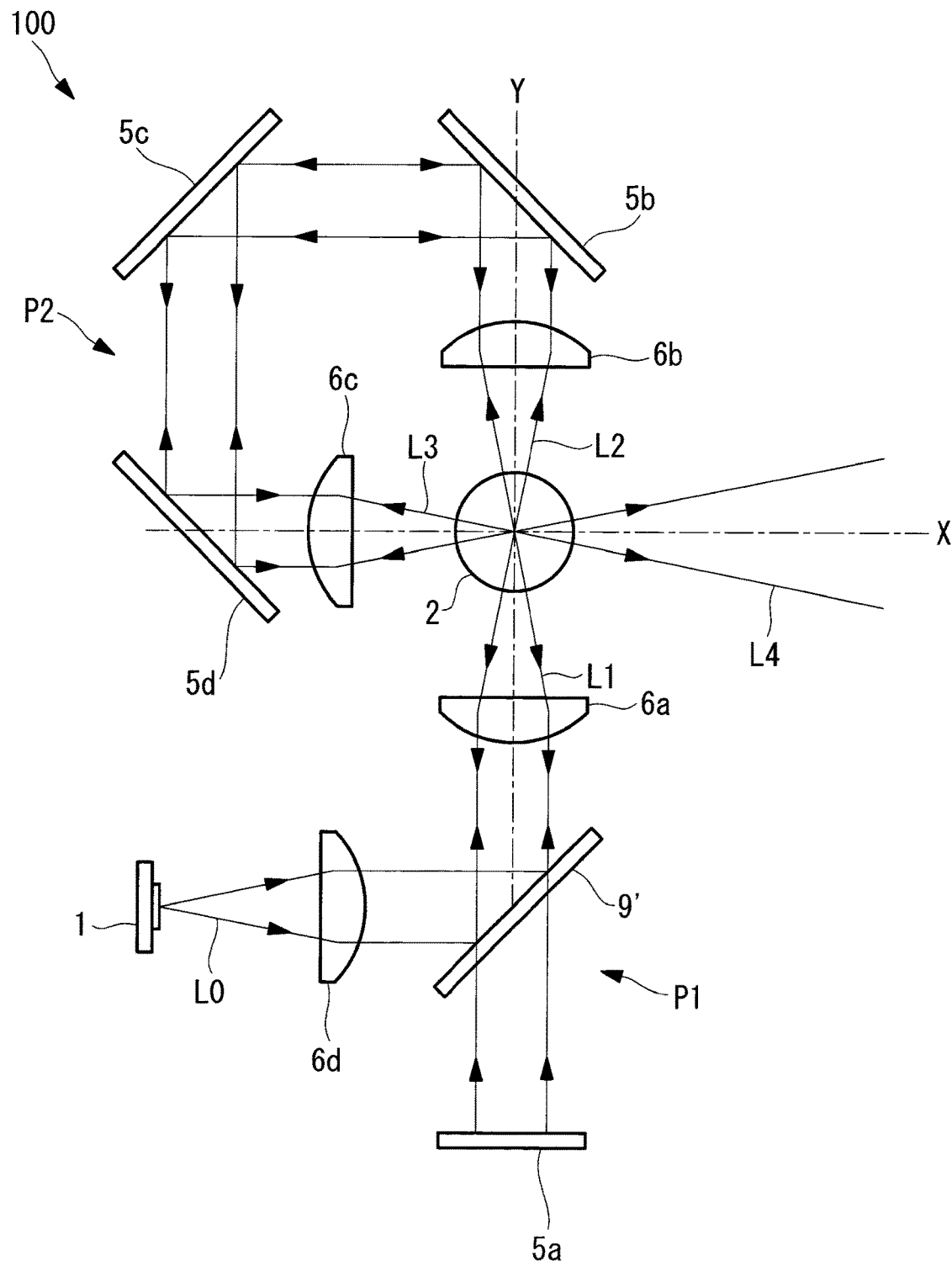
FIG. 10 is an illustration showing the overall configuration of another modification of the light-source optical system shown in FIG. 1.
Figure 11:
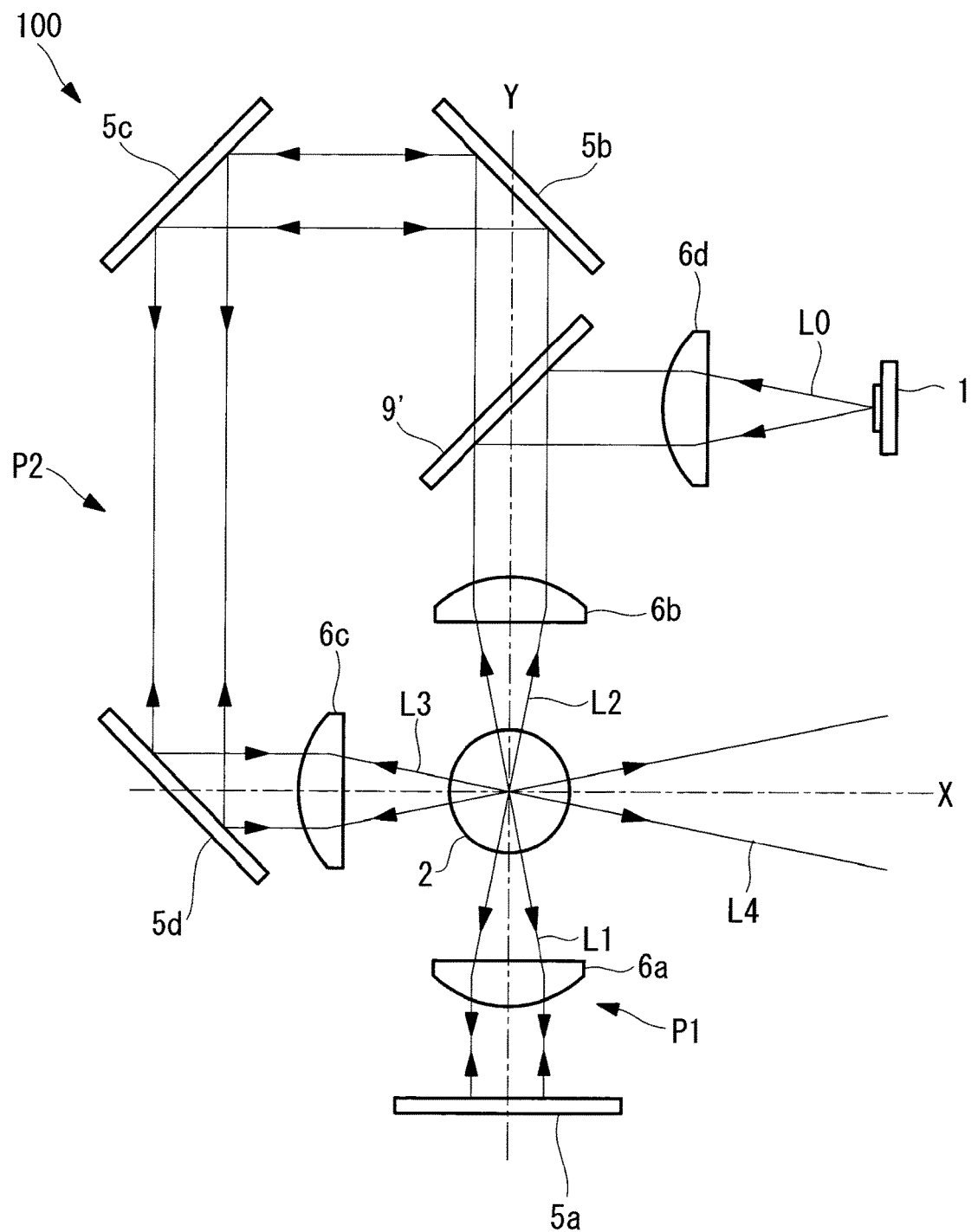
FIG. 11 is an illustration showing the overall configuration of another modification of the light-source optical system shown in FIG. 1.
Figure 12:
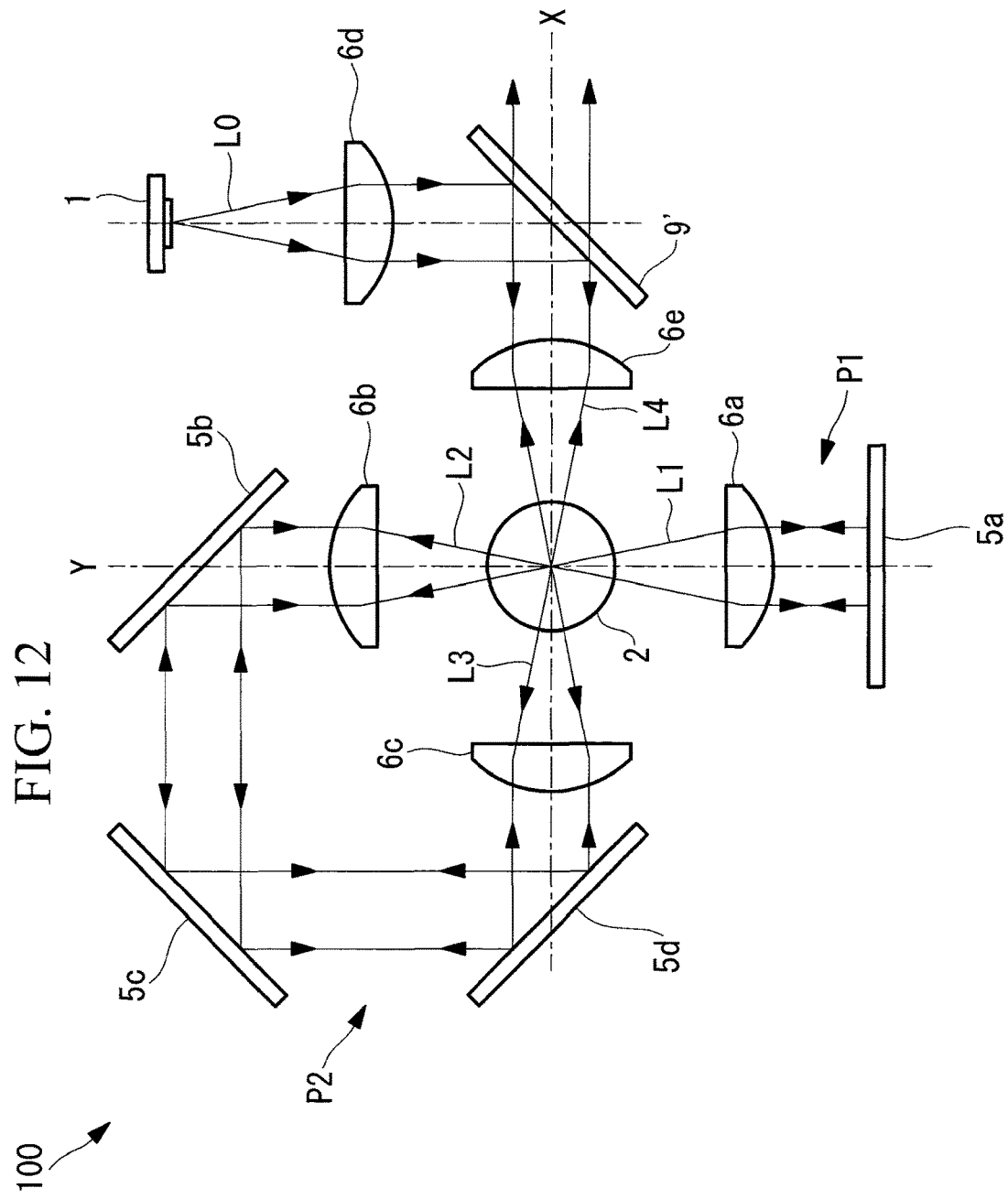
FIG. 12 is an illustration showing the overall configuration of another modification of the light-source optical system shown in FIG. 1.

Furthermore, the placement of the light source 1 and the dichroic mirror 9' may be modified as shown in FIGS. 10 to 12.

FIG. 10 shows a modification in which the dichroic mirror 9' is disposed between the wavelength conversion unit 2 and the flat mirror 5a. FIG. 11 shows a modification in which the dichroic mirror 9' is disposed between the wavelength conversion unit 2 and the flat mirror 5b. Alternatively, the dichroic mirror 9' may be disposed on the positive side of the X axis, as shown in FIG. 12. In this case, a convex lens 6e that converges the excitation light L0 at the wavelength conversion unit 2 is added between the wavelength conversion unit 2 and the dichroic mirror 9'.

Accordingly, the excitation light L0 passes through the wavelength conversion unit 2 twice in the configurations shown in FIGS. 10 and 11 and four times in the configuration shown in FIG. 12. Thus, the usage efficiency of the excitation light L0 is improved, and the ratio of the excitation light L0 that is subjected to the wavelength conversion increases. This makes it possible to output light having even higher luminance.

Furthermore, in the configuration shown in FIG. 5 and FIGS. 7 to 12, a retroreflective element (e.g., a corner cube) may be used instead of the flat mirror 5a. Furthermore, the spherical mirror 3 described earlier may be used instead of the combination of the flat mirror 5a and the convex lens 6a.

Second Embodiment

Next, a light-source optical system 200 according to a second embodiment of the present invention will be described with reference to FIG. 13.

In the configuration according to the first embodiment, the light beams L1 to L4 radiated from the wavelength conversion unit 2 in four mutually different directions in the same plane are made to overlap each other. The light-source optical system 200 according to this embodiment is configured to output, in an overlapping fashion, an even number of light beams greater than or equal to six, radiated from the wavelength conversion unit 2 in mutually opposite directions along three or more axes in the same plane.

Figure 13:
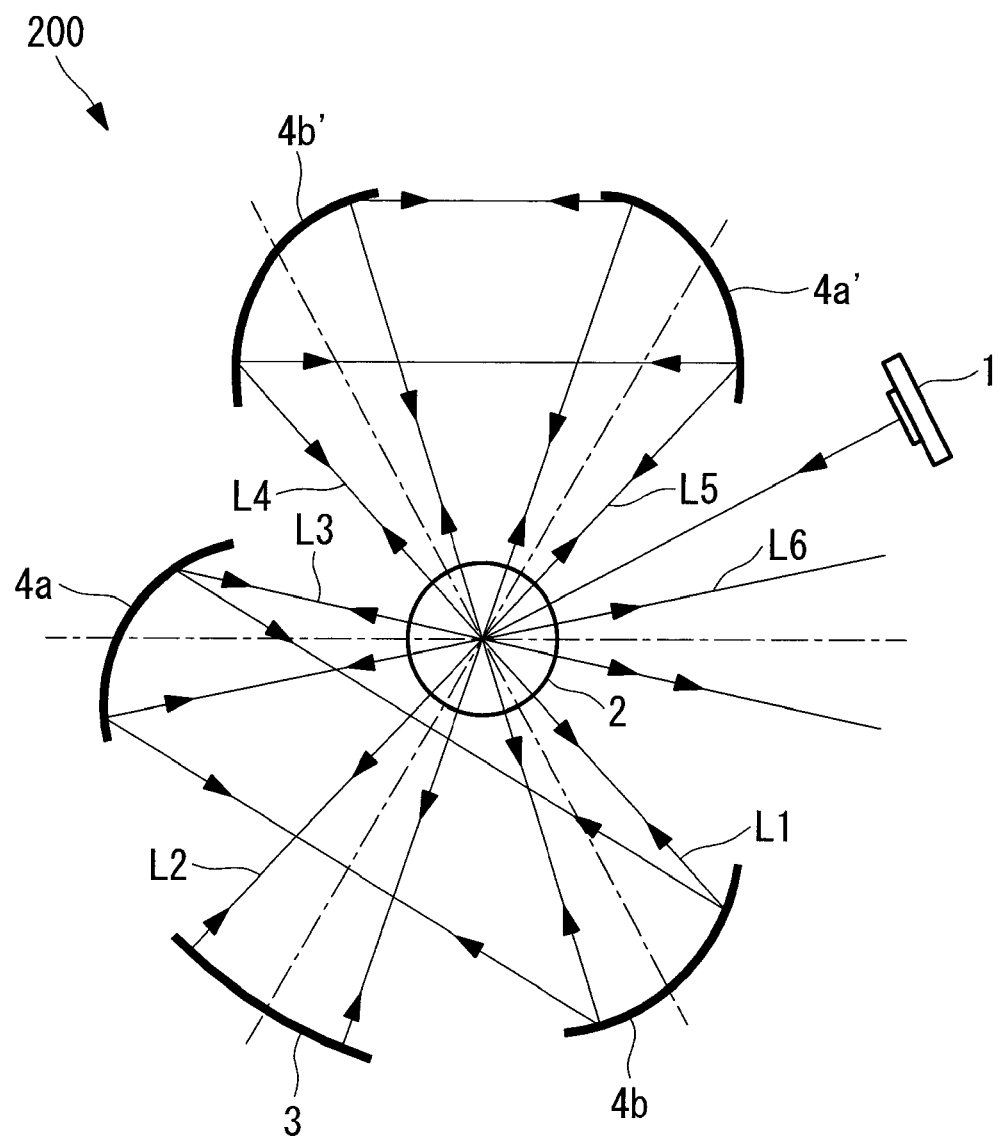
FIG. 13 is an illustration showing the overall configuration of a light-source optical system according to a second embodiment.

FIG. 13 shows an example configuration of the light-source optical system 200. The light-source optical system 200 includes two pairs of parabolic mirrors 4a, 4b and 4a', 4b' that serve as the light deflection and convergence unit and that are disposed such that the focal points thereof coincide with the center of the wavelength conversion unit 2, and also includes a spherical mirror 3 that is disposed such that the center of curvature thereof coincides with the center of the wavelength conversion unit 2. With the light-source optical system 200 described above, it is possible to output the light beams L1 to L5 radiated from the wavelength conversion unit 2 in mutually different directions such that the light beams L1 to L5 overlap the light beam L6. This makes it possible to output light having even higher luminance compared with the first embodiment.

The number of pairs of parabolic mirrors may be increased such that light beams radiated in eight, ten, twelve, . . . mutually different directions are made to overlap each other. In this case, as the number of light beams that are made to overlap each other increases, the NA of each of the light beams decreases, so that light with a small etendue is output. For example, in the case where light beams radiated in four different directions are made to overlap each other, it is possible to output light with a maximum NA of about 0.71. In the case where the effective NA of the optical system disposed downstream of the light-source optical system 200 is less than 0.71, the effective NA of the light that is output should be decreased and the number of light beams that are made to overlap each other should be increased, as in this embodiment.

Furthermore, although the parabolic mirrors 4a, 4b, 4a' and 4b' and the spherical mirror 3 are used as the light deflection and convergence unit in this embodiment, alternatively, similarly to the first embodiment, a combination of a convex lens and a flat mirror or a combination of a convex lens, a fiber, and a spherical mirror may be used, and a retroreflective element (e.g., a corner cube) may be used instead of the spherical mirror. Furthermore, the optical path of the excitation light L0 and the optical path of the wavelength-converted light generated by the wavelength conversion unit 2 may be unified by using a convex lens, a flat mirror, and the dichroic mirrors 9 and 9'.

It is to be noted that, although the number of light beams that are radiated in the XY plane and that are made to overlap each other may be chosen arbitrarily as long as the light beams are those radiated in an even number of directions greater than or equal to four also in third to seventh embodiments described below, the following descriptions will be given mainly in the context of configurations in which light beams radiated only in four different directions are made to overlap each other.

Third Embodiment

Next, a light-source optical system 300 according to a third embodiment of the present invention will be described with reference to FIGS. 14 and 15.

Regarding this embodiment, the description will be directed mainly to parts that differ from those in the first and second embodiments, and parts that are common with those in the first and second embodiments are designated by the same reference signs and will not be described.

In the configuration according to the second embodiment, light beams radiated from the wavelength conversion unit 2 in mutually different directions in the same plane are made to overlap each other. The light-source optical system 300 according to this embodiment is an example in which the configuration is extended to the three-dimensional space. That is, in the configuration according to this embodiment, light beams radiated from the wavelength conversion unit 2 in mutually opposite directions along an axis not lying in the XY plane are made to overlap light beams lying in the XY plane, whereby light beams radiated in an even number of directions in total, which is six, eight, or a greater, are made to overlap each other.

Figure 14:
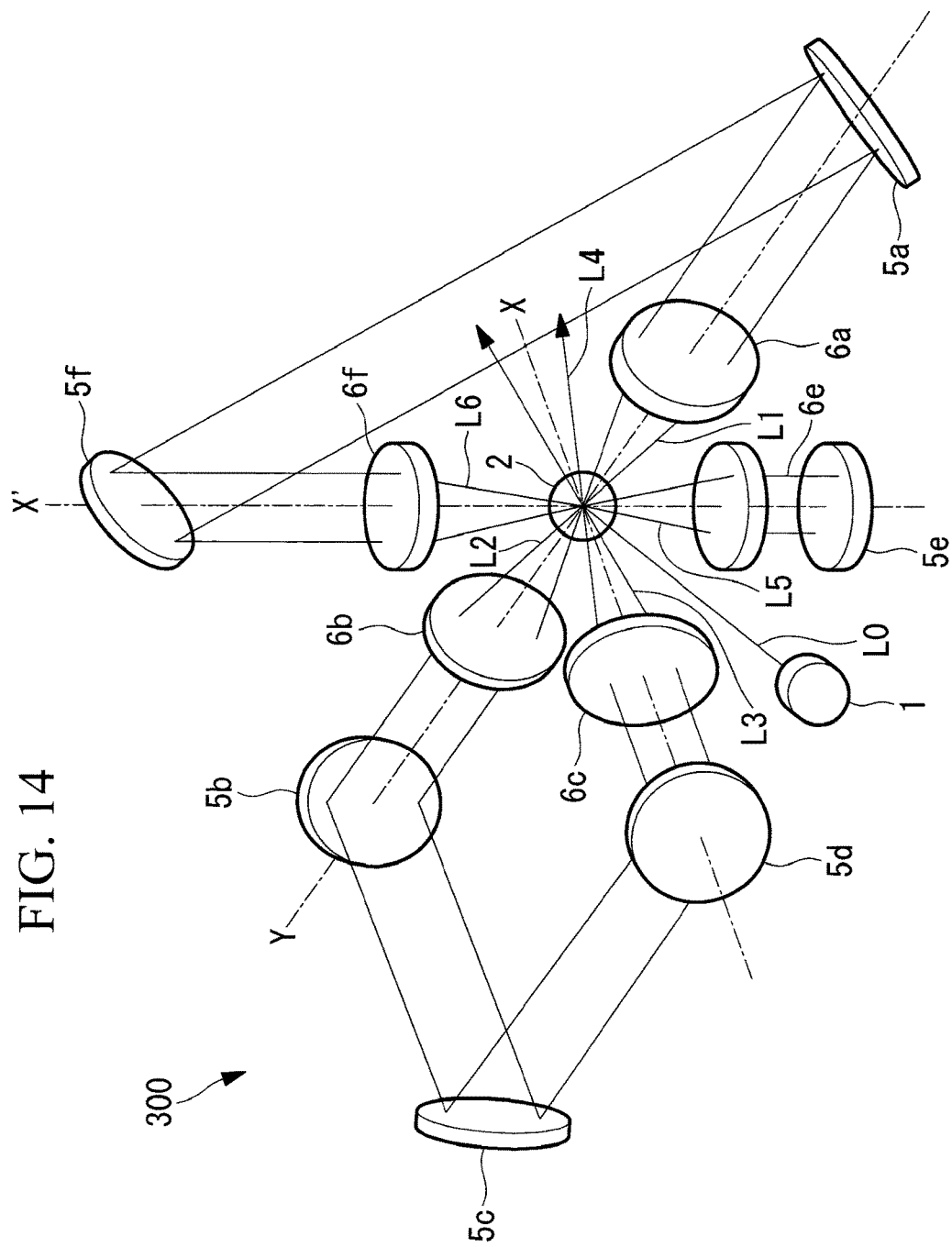
FIG. 14 is an illustration showing the overall configuration of a light-source optical system according to a third embodiment.

FIG. 14 shows an example configuration of the light-source optical system 300. In the configuration shown in FIG. 14, a total of six light beams, including two light beams L5 and L6 in addition to the four light beams L1, L2, L3, and L4 shown in FIG. 3, radiated from the wavelength conversion unit 2 in mutually different directions in the XY plane, are made to overlap each other and are output as a single light beam. Here, the two light beams L5 and L6 are radiated from the wavelength conversion unit 2 in mutually different directions along an X' axis not lying in the XY plane. Furthermore, as explained at the end of the description of the second embodiment, although the number of light beams in the XY plane may be chosen arbitrarily as long as it is an even number greater than or equal to four, for the purpose of simplicity, only light beams in four directions will be considered here as light beams in the XY plane.

In the configuration shown in FIG. 14, compared with the configuration shown in FIG. 3, two convex lenses 6e and 6f and two flat mirrors 5e and 5f are added as the light deflection and convergence unit.

The light beam L5 on the X' axis is converted into collimated light by the convex lens 6e, is deflected by 180° by the flat mirror 5e, is converged by the convex lens 6e, re-enters the wavelength conversion unit 2, and overlaps the other light beam L6 on the X' axis. The light beams L5 and L6 are deflected by the flat mirrors 5f and 5a so as to overlap the light beams in the XY plane. Thus, the six light beams L1 to L6 are output in an overlapping fashion. Since it is possible to also utilize light beams radiated in directions not lying in the same plane, it is possible to further increase the intensity of output light.

Figure 15:
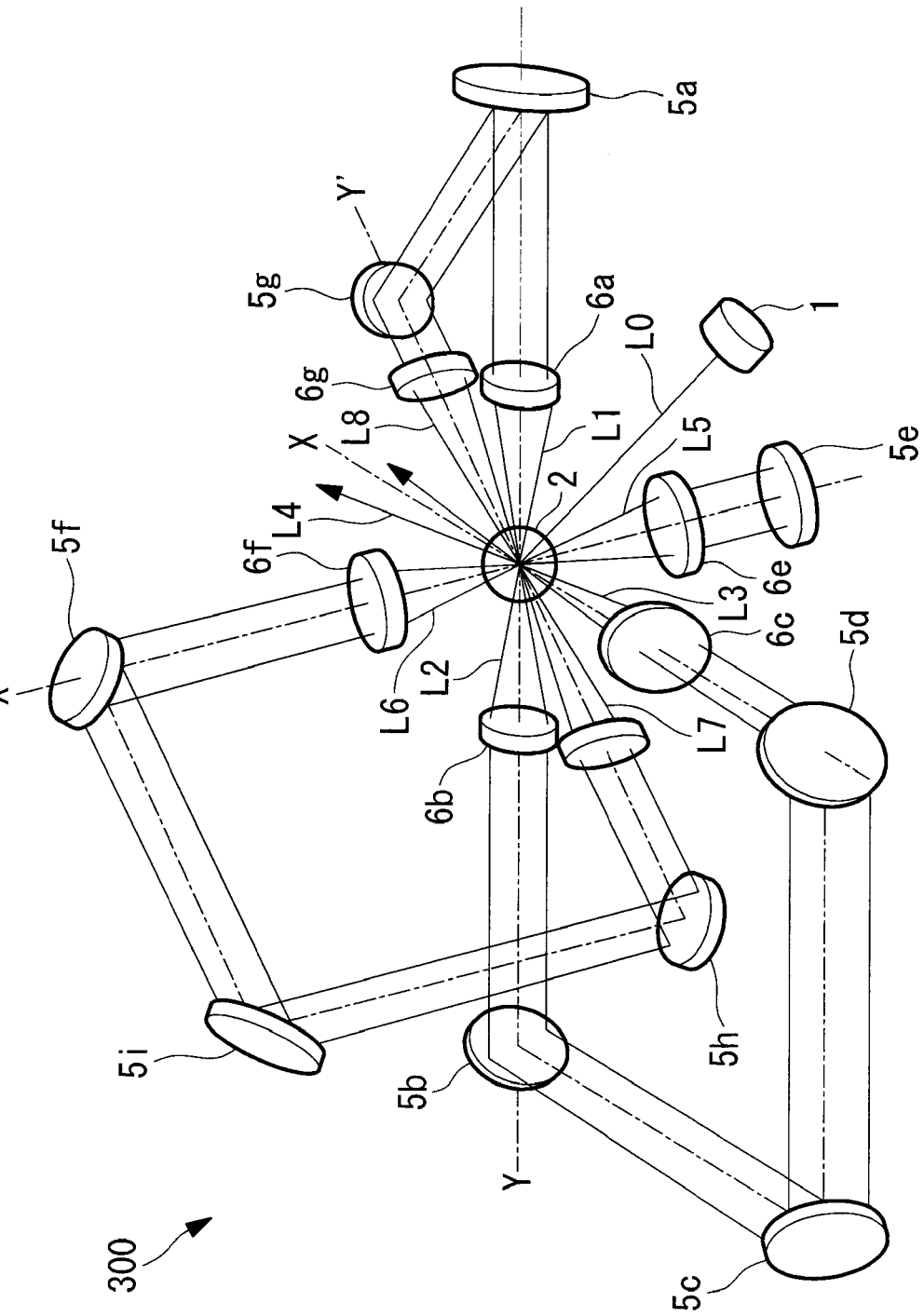
FIG. 15 is an illustration showing the overall configuration of a modification of the light-source optical system shown in FIG. 14.

FIG. 15 shows an example in which two light beams L7 and L8 radiated from the wavelength conversion unit 2 in mutually opposite directions on a Y' axis that does not lie in the XY plane and that is different from the X' axis are further added to the configuration shown in FIG. 14, whereby a total of eight light beams are output in an overlapping fashion.

In the configuration shown in FIG. 15, a total of eight light beams lying in two planes, namely, the XY plane and the X'Y' plane, are output in an overlapping fashion. Similarly to the configuration shown in FIG. 3, the light deflection and convergence unit for the XY plane are constituted of convex lenses and flat mirrors. The light deflection and convergence unit for the X'Y' plane is also constituted of convex lenses and flat mirrors; however, a convex lens 6g and a flat mirror 5g are added at the output section for the XY plane. The flat mirror 5a in the XY plane and the flat mirror 5g in the X'Y' plane are disposed at an inclination such that the light beams reflected by these flat mirrors overlap each other. Thus, it is possible to output, in an overlapping fashion, a total of eight light beams L1 to L8, radiated from the wavelength conversion unit 2 in mutually different directions in the XY plane and the X'Y' plane. This makes it possible to output light having even higher luminance.

Furthermore, in the configuration shown in FIG. 15, it is possible to add two light beams radiated in mutually opposite directions on an X" axis that does not lie in the XY plane or the X'Y' plane. In this case, it is possible to add the X" axis similarly to the case of extending the configuration shown in FIG. 3 to the configuration shown in FIG. 14. That is, the components are disposed on the X" axis in the order of a flat mirror, a convex lens, the wavelength conversion unit 2, a convex lens, and a flat mirror, and one of the flat mirrors is disposed so as to reflect a light beam on the X" axis in the opposite direction. Furthermore, the other flat mirror on the X" axis and the flat mirror 5e in the X'Y' plane are disposed at angles such that the light beams reflected by these flat mirrors overlap each other. Thus, a total of ten light beams are made to overlap each other to become a single light beam. This makes it possible to output light having even higher luminance.

As described above, the number of light beams that are made to overlap can be increased to any even number. Furthermore, as opposed to the second embodiment, the axes of the individual light beams need not necessarily lie in the same plane. Therefore, theoretically, it is possible to output, in an overlapping fashion, light beams radiated from the wavelength conversion unit 2 in all directions, as a single light beam having a small etendue.

Furthermore, although convex lenses and flat mirrors are used as the light deflection and convergence unit in this embodiment, alternatively, similarly to the first embodiment, a combination of a parabolic mirror and a spherical mirror or a combination of a convex lens, a fiber, and a spherical mirror may be used, and a retroreflective element (e.g., a corner cube) may be used instead of the spherical mirror. Furthermore, the optical path of the excitation light L0 and the optical path of wavelength-converted light generated by the wavelength conversion unit 2 may be unified by using convex lenses, flat mirrors, and the dichroic mirrors 9 and 9'.

Fourth Embodiment

Next, a light-source optical system 400 according to a fourth embodiment of the present invention will be described with reference to FIGS. 16 to 18.

Regarding this embodiment, the description will be directed mainly to parts that differ from those in the first to third embodiments, and parts that are common with those in the first to third embodiments are designated by the same reference signs and will not be described.

Figure 16:
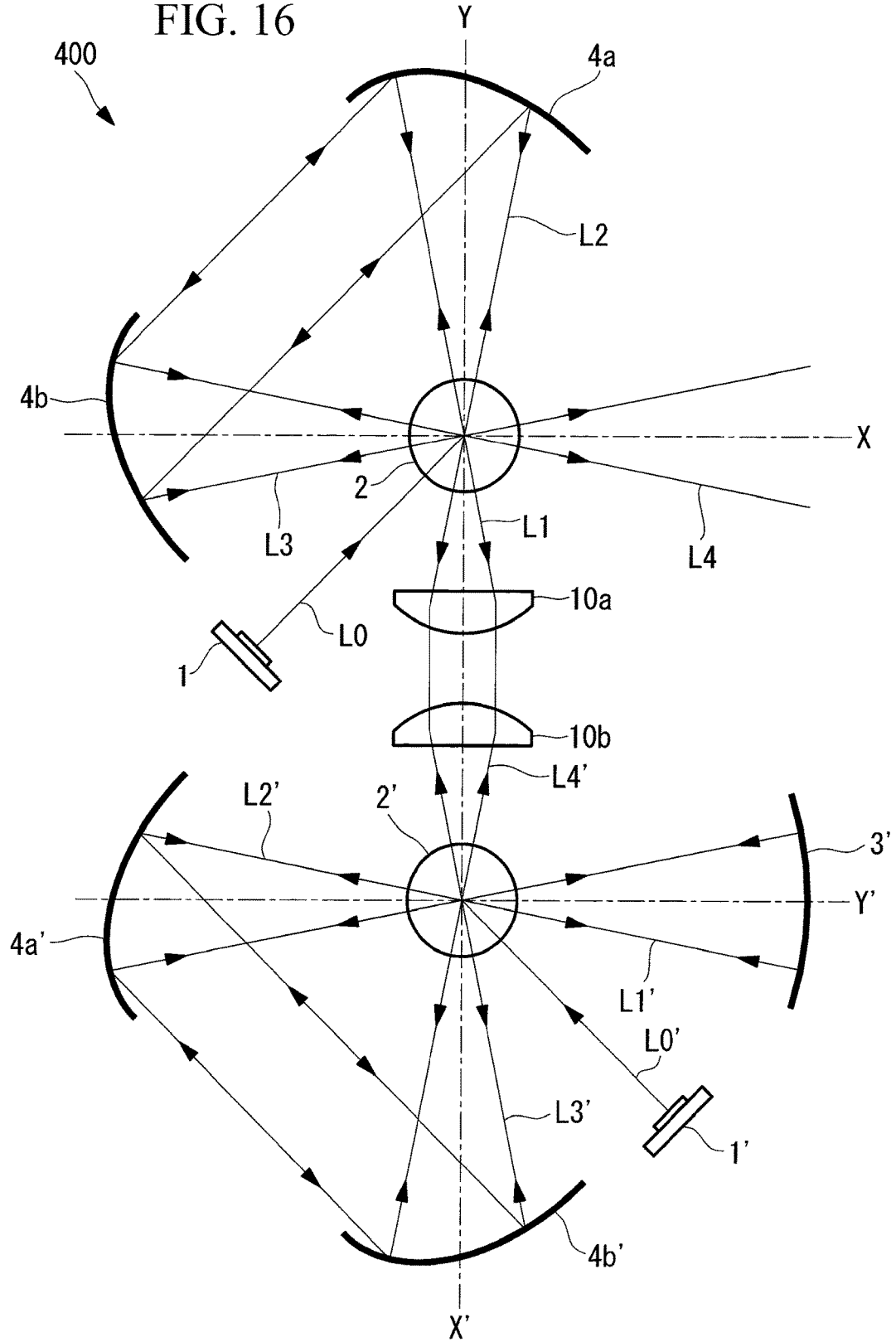
FIG. 16 is an illustration showing the overall configuration of a light-source optical system according to a fourth embodiment.

As shown in FIG. 16, the light-source optical system 400 according to this embodiment includes two sets of the optical circuit described in the context of the first embodiment, including the light source 1, the wavelength conversion unit 2, and the concave mirrors 3, 4a, and 4b, and also includes an optical relay unit that relays light beams L1 to L3 and L1' to L4' between the two optical circuits. That is, the light-source optical system 400 is configured to output, in an overlapping fashion, all the light beams (a total of eight light beams) radiated in four mutually different directions from each of the wavelength conversion units 2 and 2'. Also in this embodiment, it is possible to make any even number of light beams overlap each other. For the purpose of simplicity, however, the description will be given mainly in the context of a configuration in which light beams radiated in four mutually different directions from each of the wavelength conversion units 2 and 2' are made to overlap each other.

FIG. 16 shows an example configuration of the light-source optical system 400. One of the optical circuits is configured in the same way as the light-source optical system 100 in the first embodiment, except that the spherical mirror 3 is omitted. The other optical circuit is disposed such that the X' axis thereof and the Y axis of the one optical circuit overlap each other on the same line. In the drawings that are referred to, "'" is added to reference signs for the components of the other optical circuit.

The optical relay unit is constituted of a pair of convex lenses 10a and 10b that are disposed such that the convex faces thereof face each other. The convex lenses 10a and 10b are disposed such that the focal points thereof are located at the centers of the wavelength conversion units 2 and 2', respectively.

With the thus-configured light-source optical system 400 according to this embodiment, eight mutually independent light beams L1 to L4 and L1' to L4' radiated from the two wavelength conversion units 2 and 2' are output in an overlapping fashion. Thus, an advantage is afforded in that it is possible to increase the intensity of output light while maintaining a small etendue. Furthermore, in the case where the wavelength conversion units 2 and 2' that are used generate light in mutually different colors, an advantage is afforded in that it is possible to output light in various colors. Other advantages of this embodiment are the same as those of the first embodiment, so that descriptions thereof are omitted.

Figure 17:
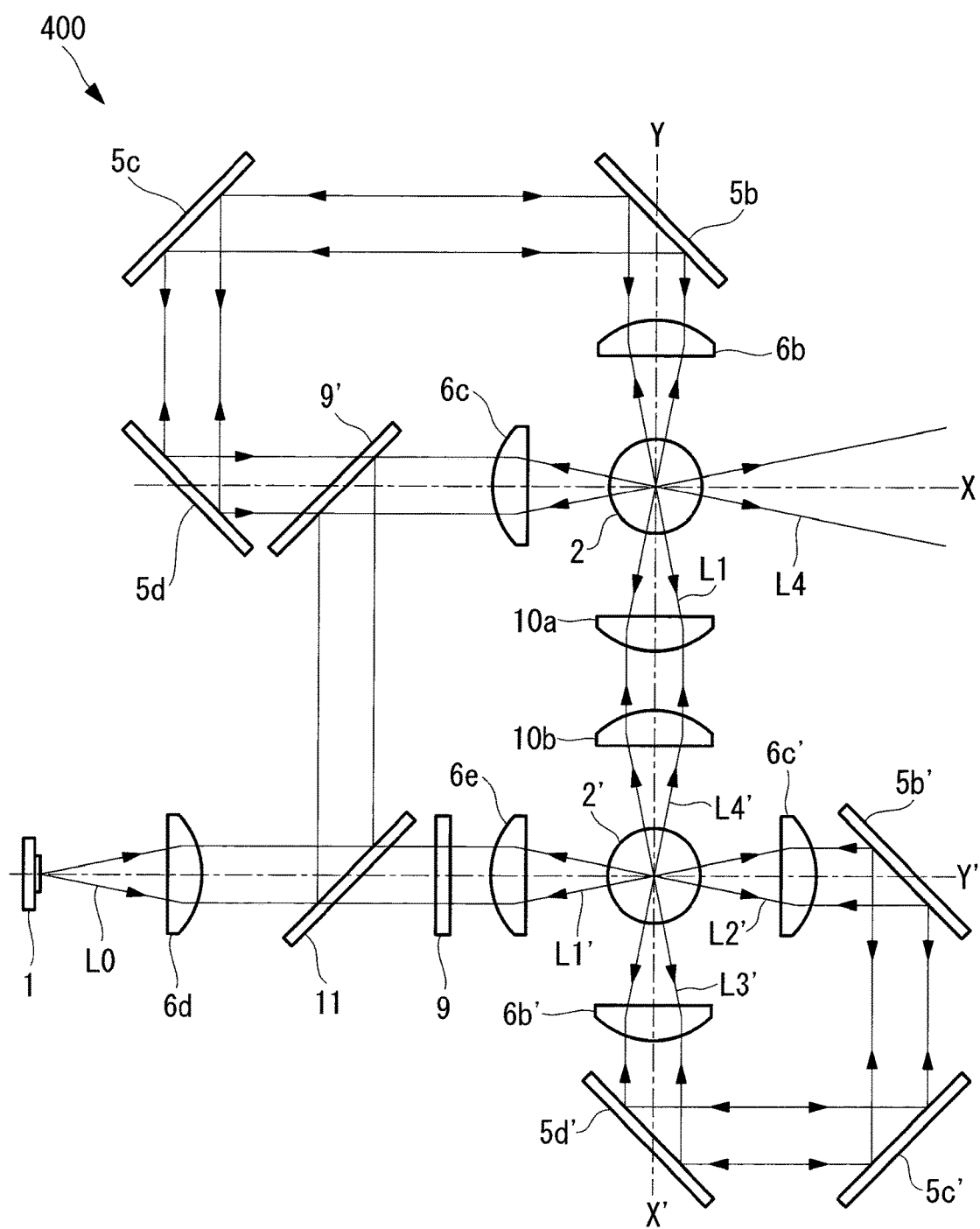
FIG. 17 is an illustration showing the overall configuration of a modification of the light-source optical system shown in FIG. 16.

Although the concave mirrors 3', 4a, 4b, 4a', and 4b' are used as the light deflection and convergence unit in this embodiment, alternatively, as shown in FIG. 17, flat mirrors 5b to 5d, 5b' to 5d', and 9 and convex lenses 6b, 6c, 6b', 6c, and 6e may be used.

Furthermore, as described in the context of the first embodiment, the dichroic mirrors 9 and 9' that combine the optical path of the excitation light L0 from the light source 1 with the optical paths of the light beams L1 to L4 and L1' to L4' may be further provided.

Furthermore, as shown in FIG. 17, a half mirror 11 that splits the excitation light L0 radiated from the single light source 1 into halves to distribute the excitation light L0 to the two wavelength conversion units 2 and 2' may be provided. In this case, the single light source 1 suffices, so that the size of the system as a whole can be reduced.

Figure 18:
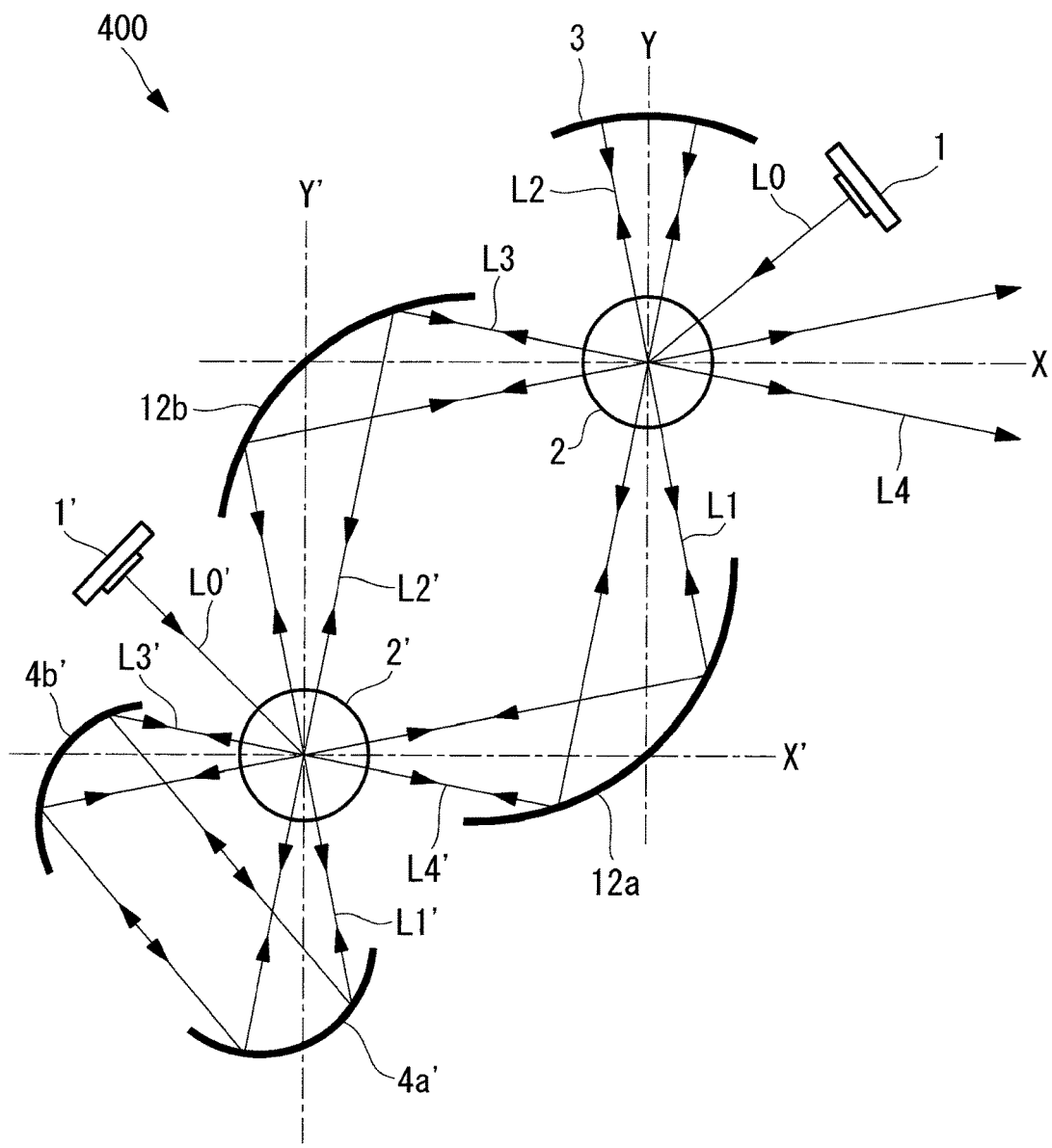
FIG. 18 is an illustration showing the overall configuration of another modification of the light-source optical system shown in FIG. 16.

FIG. 18 shows another example configuration of the light-source optical system 400. One of the optical circuits includes the spherical mirror 3 in the light-source optical system 100 according to the first embodiment. The other optical circuit includes the parabolic mirrors 4a' and 4b' in the light-source optical system 100 according to the first embodiment.

An optical relay unit 10 is constituted of two elliptical mirrors 12a and 12b. The two wavelength conversion units 2 and 2' are disposed at the focal points of the elliptical mirrors 12a and 12b.

With the thus-configured light-source optical system 400 according to this embodiment, shown in FIG. 18, the eight mutually independent light beams L1 to L4 and L1' to L4' radiated from the two wavelength conversion units 2 and 2' are output in an overlapping fashion, so that it is possible to increase the intensity of output light while maintaining a small etendue. Furthermore, since the light deflection and convergence unit and the optical relay unit are all constituted of mirrors, even in the case where the wavelength conversion units 2 and 2' that are used generate light in mutually different colors, an advantage is afforded in that chromatic aberration due to the individual optical elements does not occur. Other advantages of this embodiment are the same as those of the first embodiment, so that descriptions thereof are omitted.

Furthermore, although light beams are made to overlap between two optical circuits in the above embodiment of the light-source optical system 400, the number of optical circuits may be increased to three, four, or more. By increasing the number of optical circuits, it is possible to further increase the output without increasing the etendue.

Figure 19:
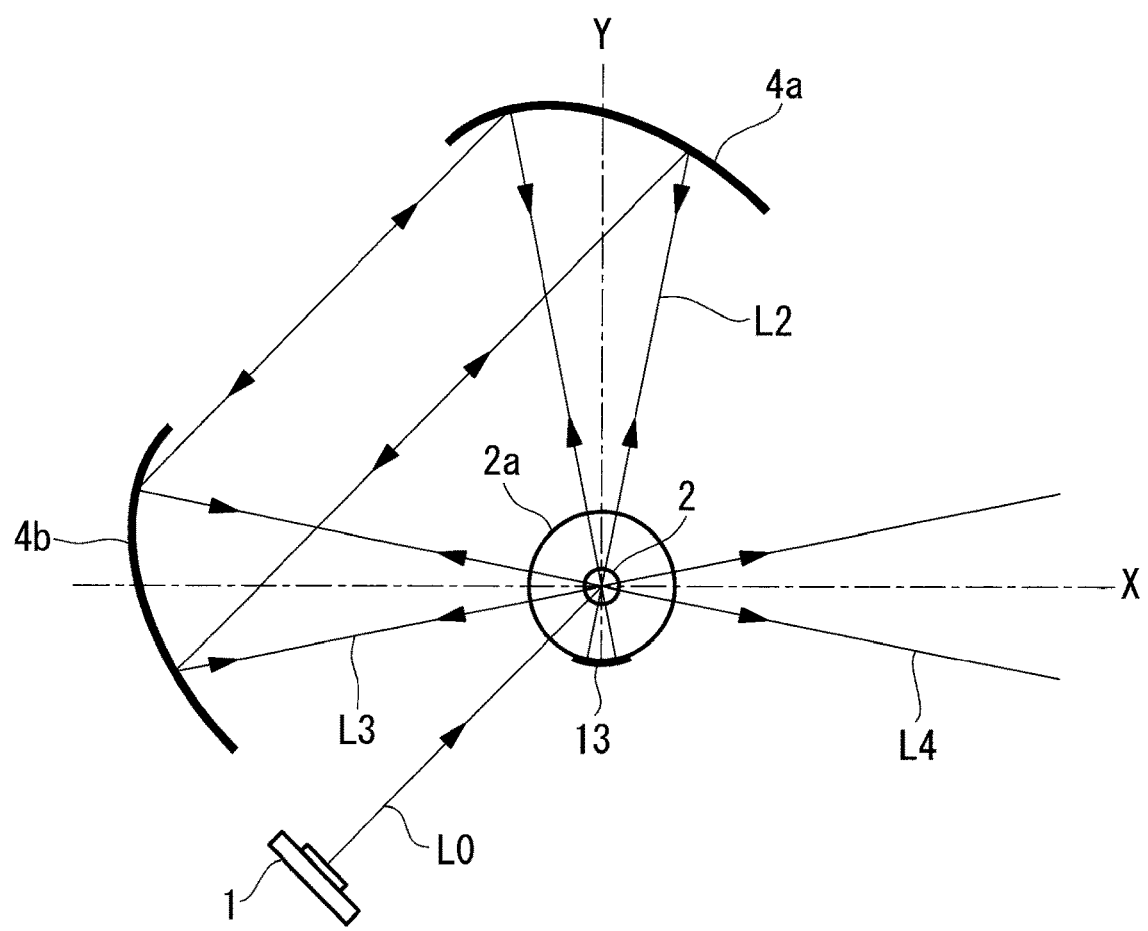
FIG. 19 is an illustration showing the configuration of a modification of a spherical mirror.

Furthermore, in the first to fourth embodiments described above, instead of the spherical mirror 3, a reflector 13 may be provided so as to conform to the outer surface of the container 2a of the wavelength conversion unit 2, as shown in FIG. 19. For example, the reflector 13 is formed of a metallic film or a dielectric multilayer film. The reflector 13 has a shape corresponding to a part of a spherical surface. The reflector 13 reflects light advancing outward in radial directions from the outer surface of the container 2a of the wavelength conversion unit 2 toward the center of the container 2a, thereby functioning in the same way as the spherical mirror 3.

It is possible to reduce the size of the system as a whole by integrally forming a part of the light deflection and convergence unit with the container 2a for holding the wavelength conversion unit 2.

Figure 20A:
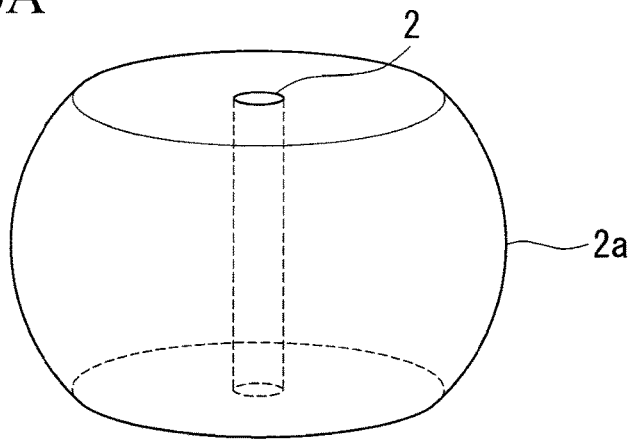
FIG. 20A is a perspective view showing a modification of a container that holds a wavelength conversion unit.
Figure 20B:
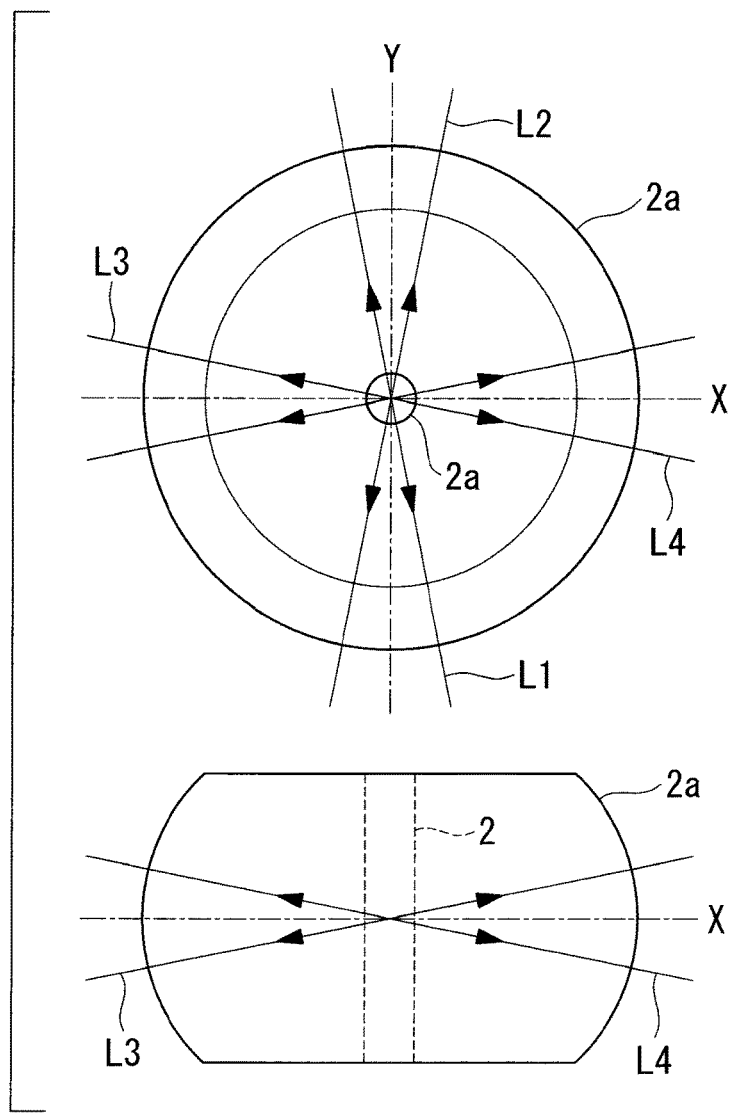
FIG. 20B shows a top view (upper) and a side view (lower) of the container shown in FIG. 20A.
Figure 21:
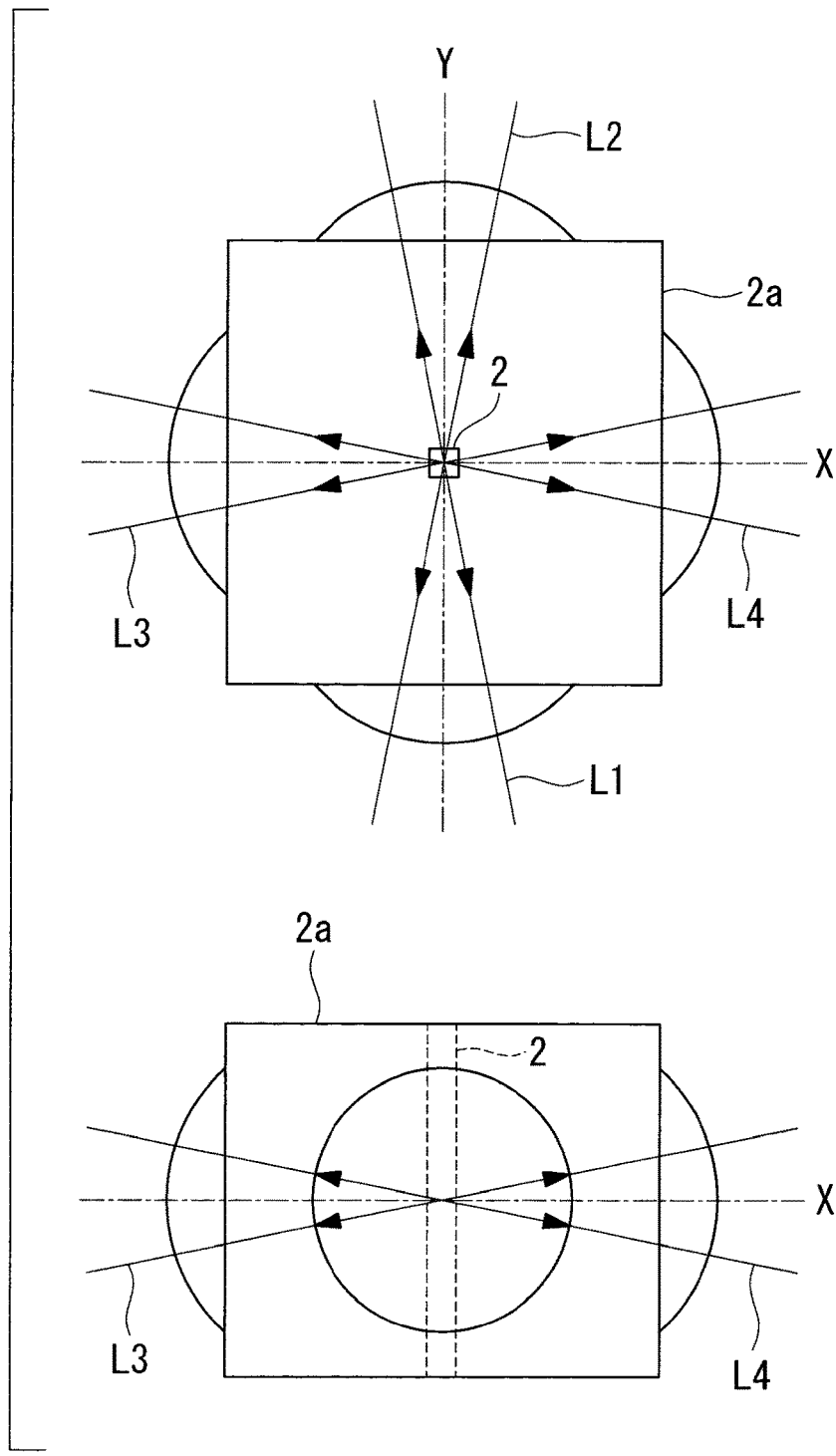
FIG. 21 shows a top view (upper) and a side view (lower) of another modification of the container that holds the wavelength conversion unit.

Furthermore, although the container 2a that holds the wavelength conversion unit 2 has a perfectly spherical shape in the first to fourth embodiments described above, the shape of the container 2a may be modified as appropriate. The shape of the container 2a may be any shape as long as the part that passes effective light beams in the wavelength-converted light generated by the wavelength conversion unit 2 has a spherical shape. By partially modifying the shape of the container 2a, the flexibility of the design of the mechanism for holding the container 2a, the mechanism for encapsulating the material of the wavelength conversion unit 2, etc. can be increased. For example, in the first embodiment, it suffices for the container 2a that at least the part that passes the light beams L1 to L4 have a spherical shape, so that the shape of the container 2a may be a combination of a spherical shape and a flat shape, as shown in FIGS. 20A, 20B, and 21. The container 2a shown in FIGS. 20A, 20B, and 21 can be fixed by using the flat portion thereof.

Figure 22A:
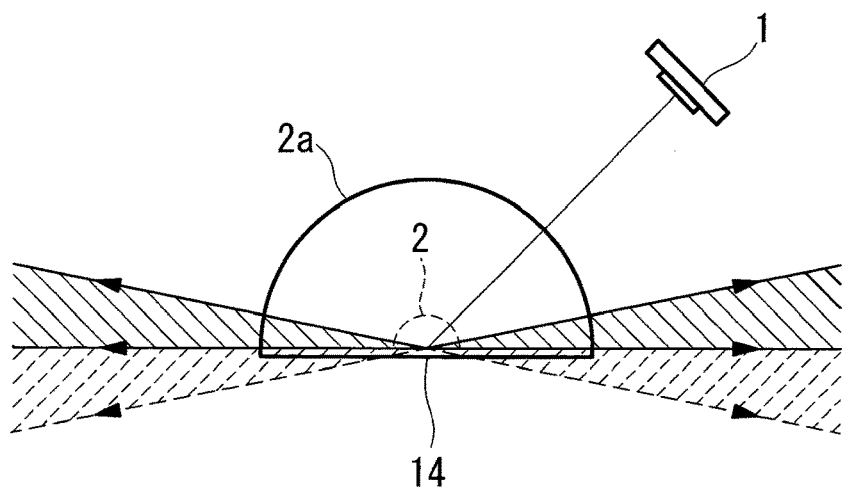
FIG. 22A shows a side view and a top view of another modification of the container that holds the wavelength conversion unit.
Figure 22B:
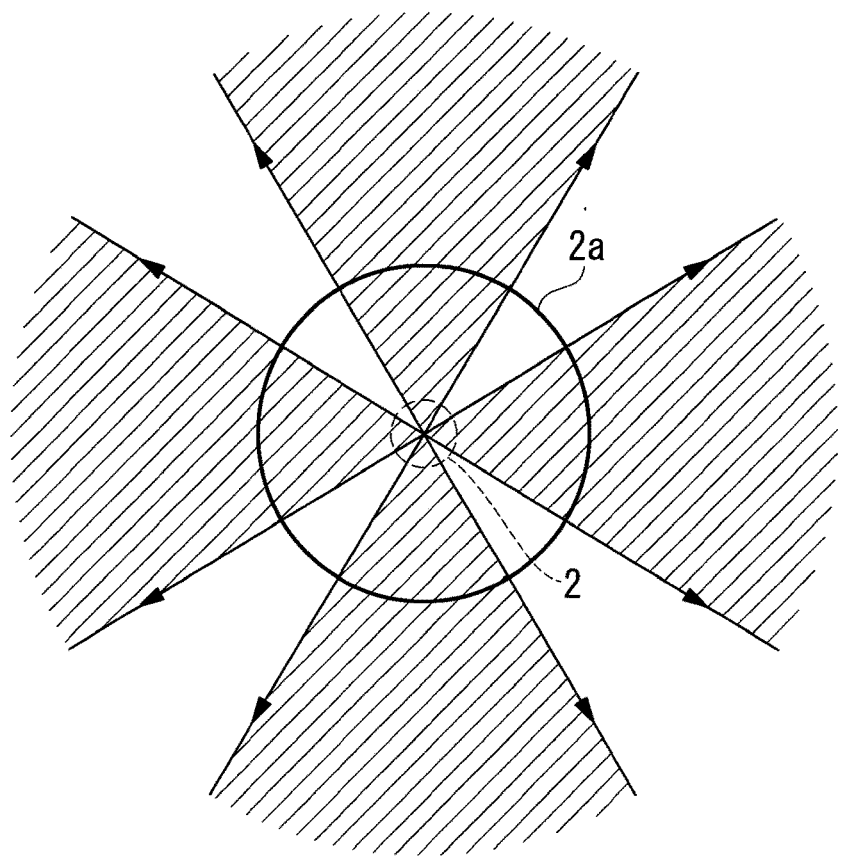
FIG. 22B is a top view of the container shown in FIG. 22A.

Alternatively, as shown in FIGS. 22A and 22B, the container 2a may have a semi-spherical shape. In this case, preferably, a reflector 14 that reflects wavelength-converted light should be provided on the flat face of the container 2a. For example, the reflector 14 is formed of a metallic film or a dielectric multilayer film. The light beams radiated from the flat face of the container 2a (the portion indicated by broken hatching in FIG. 22A) are reflected by the reflector 14 and overlap the light beams radiated from the spherical face (the portion indicated by solid hatching in FIG. 22A). This makes it possible to also utilize the light beams radiated from the flat face, so that the same advantages as those in the case of a spherical container are afforded.

The shape of the wavelength conversion unit 2 is also preferably spherical but may be modified as appropriate as long as at least a part of the wavelength conversion unit 2 is located at the center of the container 2a. For example, the shape of the wavelength conversion unit 2 may be a cylindrical or prism shape, as shown in FIGS. 20A, 20B, and 21. In this case, in order to suppress the effect of refraction at the interface between the wavelength conversion unit 2 and the container 2a, it is desired that the difference in refractive index between the wavelength conversion unit 2 and the container 2a be small. The material of the container 2a is glass or a polymer. In the case where the material of the wavelength conversion unit 2 is a phosphor or a quantum dot, the material of the wavelength conversion unit 2 is used in a form dispersed in a liquid such as an organic solvent, a polymer, etc. Thus, it is possible to choose materials having close refractive indices as the materials for the wavelength conversion unit 2 and the container 2a. In the case of a discharge lamp such as a xenon lamp, however, it is difficult to match the refractive indices of the discharge gas and the material of the container 2a, and it is also difficult to form a spherical container that encapsulates discharge gas.

Furthermore, in the case where the refractive index of the wavelength conversion unit 2 is greater than the refractive index of the container 2a, a portion of the wavelength-converted light is confined within the wavelength conversion unit 2 by total reflection, so that the output efficiency is reduced. For example, in the case where the wavelength conversion unit 2 is spherical, if the difference in refractive index between the wavelength conversion unit 2 and the container 2a is greater than or equal to 0.12, 10% of the wavelength-converted light is confined within the wavelength conversion unit 2 by total reflection. On the other hand, in the case where the refractive index of the wavelength conversion unit 2 is less than the refractive index of the container 2a, total reflection does not occur at the interface between the wavelength conversion unit 2 and the container 2a, so that it is possible to output all the light to the outside of the container 2a. Accordingly, the refractive index n1 of the wavelength conversion unit 2 and the refractive index n2 of the container 2a should preferably satisfy the following relationship:

$$n1-n2<0.12$$

Fifth Embodiment

Next, a light-source optical system 500 according to a fifth embodiment of the present invention will be described with reference to FIGS. 23A to 29.

Regarding this embodiment, parts that are common with those in the first to fourth embodiments are designated by the same reference signs, and descriptions thereof are omitted.

The light-source optical system 500 according to this embodiment is based on the configuration according to the first embodiment, shown in FIG. 1, and is configured to output, in an overlapping fashion, four light beams radiated from the wavelength conversion unit 2 in mutually different directions on the XY plane. The light-source optical system 500 includes a waveguide 20 including the wavelength conversion unit 2 and also includes a light deflection and convergence unit provided on side faces of the waveguide 20.

Figure 23A:
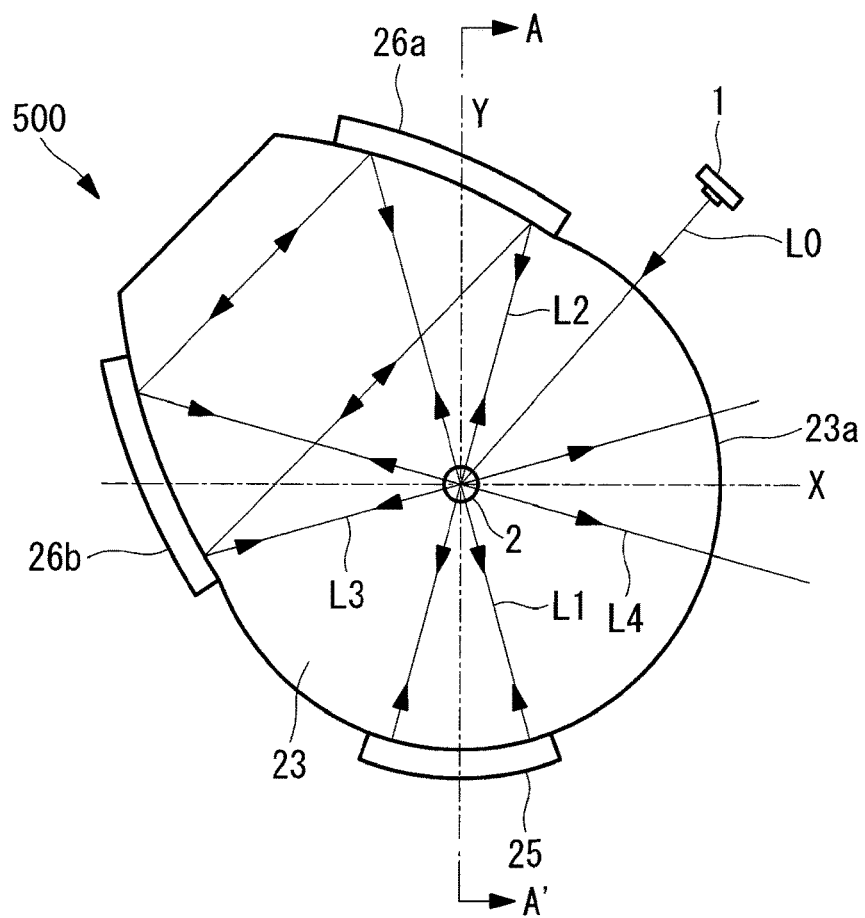
FIG. 23A is a plan view showing the configuration of a light-source optical system according to a fifth embodiment.
Figure 23B:
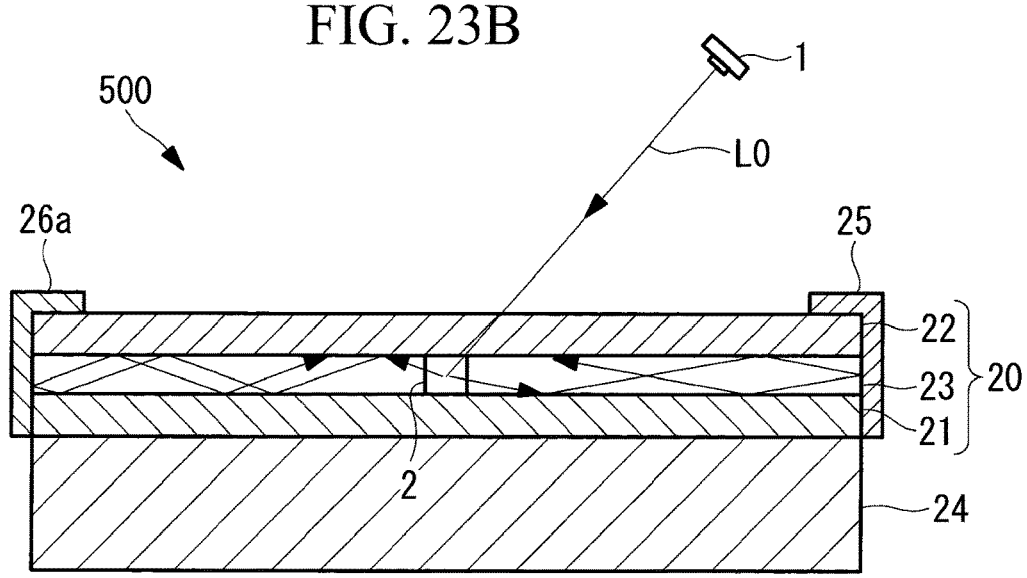
FIG. 23B is a sectional view of the light-source optical system shown in FIG. 23A, taken along A-A'.

FIG. 23A shows an example configuration of the light-source optical system 500, and FIG. 23B shows a section taken along A-A' in FIG. 23A. The waveguide 20 is constituted of a lamination of claddings 21 and 22 and a core 23 formed on a substrate 24, constituting a slab waveguide having a flat shape as a whole. Specifically, the waveguide 20 includes the first cladding 21, the core 23, and the second cladding 22 in that order from the substrate 24 side. The wavelength conversion unit 2 is located at a portion of the core 23. The core 23 is formed of a material having higher refractive indices than the claddings 21 and 22. Therefore, wavelength-converted light generated by the wavelength conversion unit 2 experiences total reflection at the interfaces between the core 23 and the claddings 21 and 22, whereby the light is guided in the planar direction inside the core 23. The substrate 24 serves to support the thin waveguide 20 and may be omitted.

For example, the materials of the core 23 and the claddings 21 and 22 are glass or a polymer. Instead of forming cladding layers, air layers may be used as the claddings 21 and 22. In order to prevent refraction of the wavelength-converted light at the interface between the wavelength conversion unit 2 and the core 23, it is desired to minimize the difference in refractive index between the wavelength conversion unit 2 and the core 23. Furthermore, since the excitation light L0 and the wavelength-converted light are also guided inside the wavelength conversion unit 2, the wavelength conversion unit 2 must have a higher refractive index than the claddings 21 and 22.

The light deflection and convergence unit includes reflectors 25, 26a, and 26b provided on at least some of the side faces of the waveguide 20. As shown in FIG. 23B, the reflectors 25, 26a, and 26b are formed as walls standing substantially perpendicularly to the planar direction of the waveguide 20 along the side faces of the waveguide 20, forming a concave shape on the side of the wavelength conversion unit 2 in the XY plane. The reflector 25 has a circular arc shape in the XY plane, and similarly to the spherical mirror 3 described earlier, the reflector 25 is disposed such that the center of the circular arc shape coincides with the center of the wavelength conversion unit 2. The reflectors 26a and 26b have parabolic shapes in the XY plane, and similarly to the parabolic mirrors 4a and 4b described earlier, the reflectors 26a and 26b are disposed such that the focal points thereof coincide with the center of the wavelength conversion unit 2. In FIG. 23A, the second cladding 22 is not shown.

The operation of the thus-configured light-source optical system 500 according to this embodiment will now be described.

As shown in FIG. 23B, the components in the Z direction (the thickness direction of the core 23) of the wavelength-converted light generated by the wavelength conversion unit 2 irradiated with the excitation light L0 are confined within the core 23 due to the total reflection at the interfaces between the core 23 and the claddings 21 and 22, so that the angles of the Z components of the individual light beams L1 to L4 are preserved. On the other hand, the components in the X and Y directions of the wavelength-converted light are reflected back toward the wavelength conversion unit 2 by the reflectors 25, 26a, and 26b on the side faces of the waveguide 20, whereby the components converge at the wavelength conversion unit 2. Thus, the light beams L1 to L4 radiated in four mutually different directions are output from the output section 23a in an overlapping fashion.

In this case, according to this embodiment, the reflectors 25, 26a, and 26b serving as the light deflection and convergence unit are formed as walls substantially perpendicular to the planar direction of the waveguide 20 and thus do not have a curvature in the Z direction (the thickness direction of the core 23). Therefore, it is possible to fabricate the waveguide 20 and the light deflection and convergence unit together and precisely by using a semiconductor process such as dry etching or photolithography, which is commonly used to fabricate waveguides. Thus, it is possible to then form the reflectors 25, 26a, and 26b, for example, by way of deposition or sputtering, so that it is not necessary to align optical elements that are fabricated separately. Accordingly, an advantage is afforded in that it is possible to manufacture products having higher reliability. Furthermore, according to this embodiment, compared with the configurations using optical components such as mirrors as in the first to fourth embodiments, an advantage is afforded in that it is possible to reduce the size of the optical system as a whole. Furthermore, in the process of fabricating the waveguide 20, as a result of dry etching, etc., the shape of the light deflection and convergence unit may have an angle relative to the Z direction (the thickness direction of the core 23) or may have a curvature. In this case, it is conceivable that the angles of light reflected by the reflectors 25, 26a, and 26b become so large that the conditions for total reflection are not satisfied. In order to avoid such a reduction in the light guiding efficiency, the angles and curvatures of the light deflection and convergence unit with respect to the Z direction should fall in ranges satisfying the conditions for total reflection.

Figure 24:
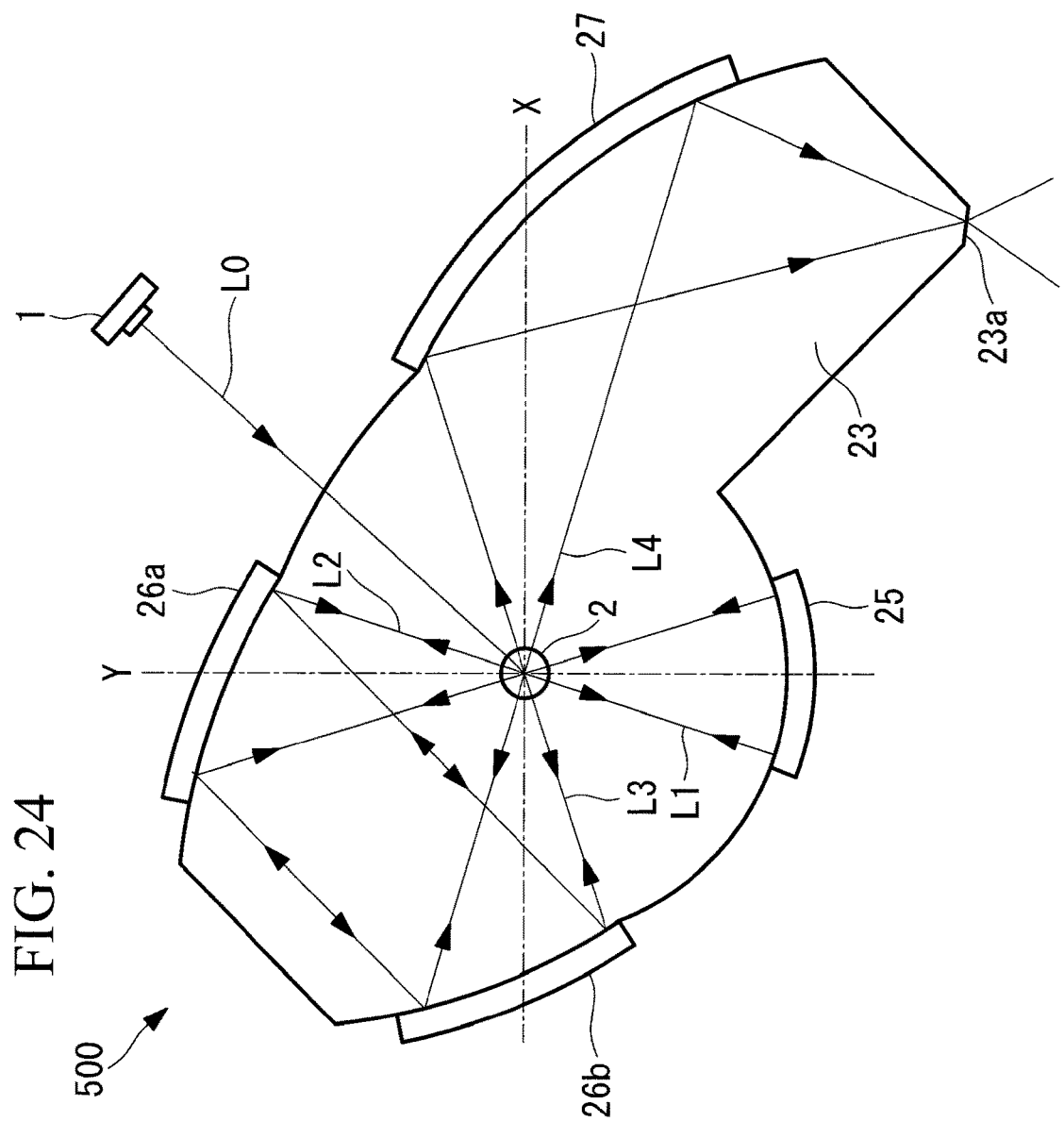
FIG. 24 is an illustration showing the configuration of a modification of the light-source optical system shown in FIG. 23A.

In this embodiment, the four light beams L1 to L4 made to overlap each other are output directly as divergent light from the wavelength conversion unit 2. Alternatively, as shown in FIG. 24, a reflector (output-light convergence unit) 27 that converges the four overlapping light beams L1 to L4 from the wavelength conversion unit 2 at the output section 23a of the waveguide 20 may be further provided on a side face of the waveguide 20. The reflector 27 has an elliptical arc shape in the XY plane and is disposed such that the two focal points thereof are located at the wavelength conversion unit 2 and the output section 23a.

Figure 25A:
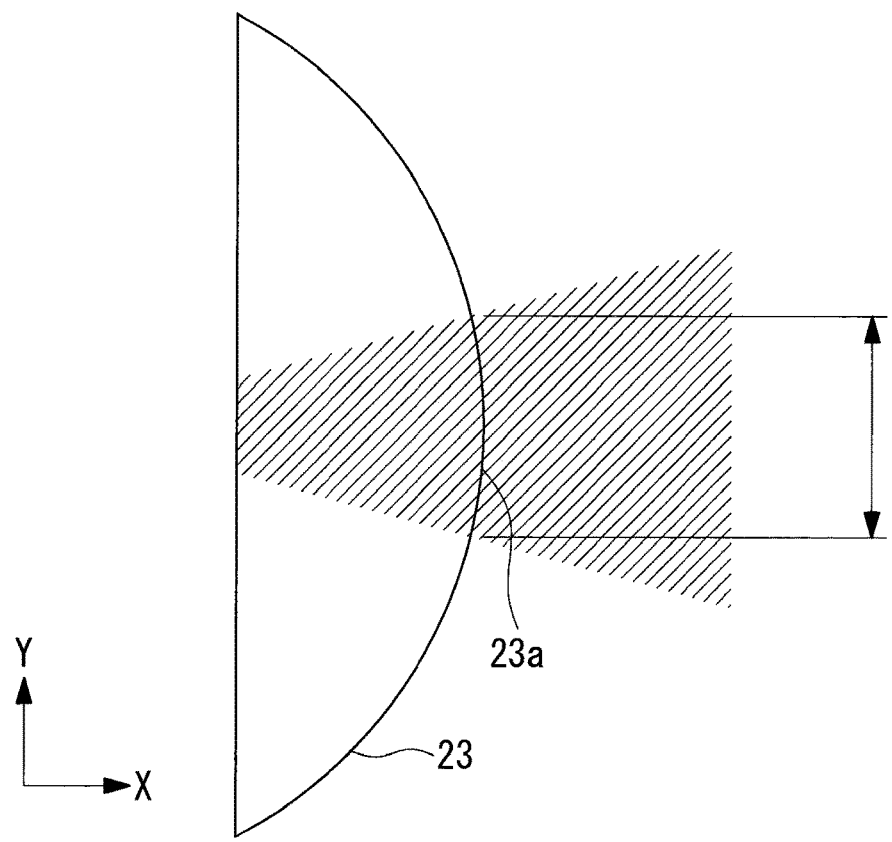
FIG. 25A is a plan view of an output section of a waveguide, which serves to explain the sectional intensity distribution of light that is output from the light-source optical system shown in FIG. 23A.
Figure 25B:
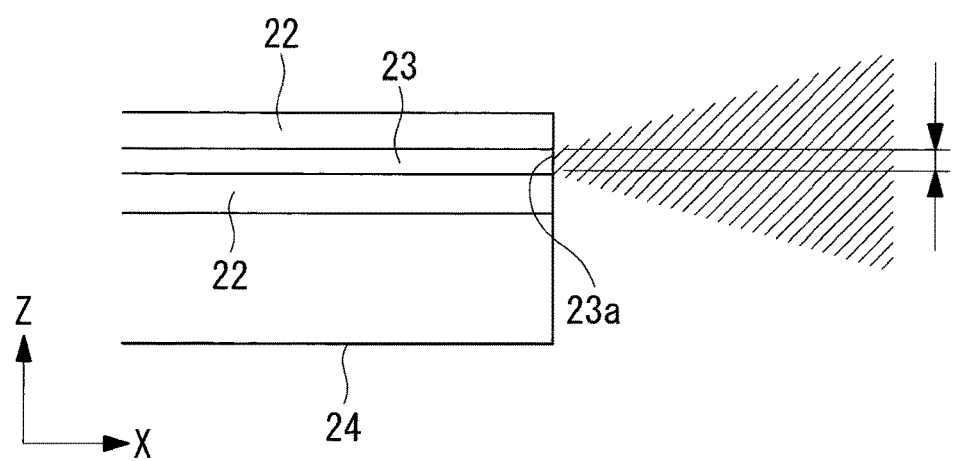
FIG. 25B is a vertical sectional view of the output section of the waveguide shown in FIG. 25A.
Figure 26:
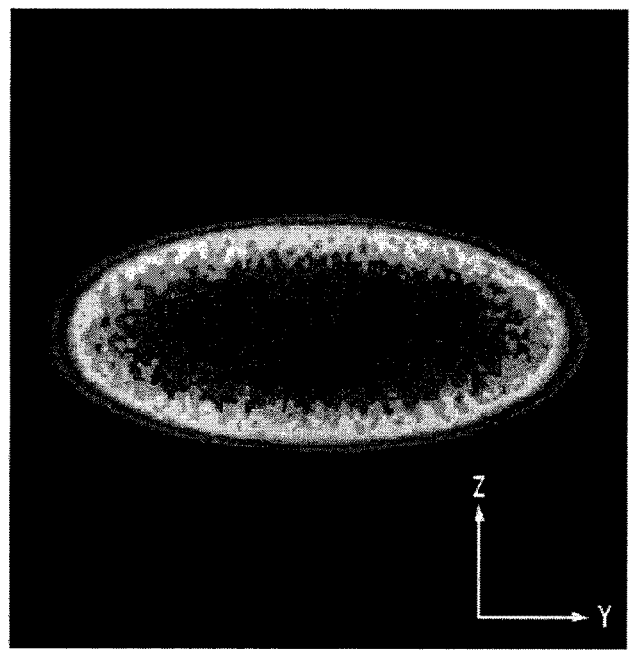
FIG. 26 is an illustration showing the sectional intensity distribution of light that is output from the light-source optical system shown in FIG. 23A.
Figure 27:
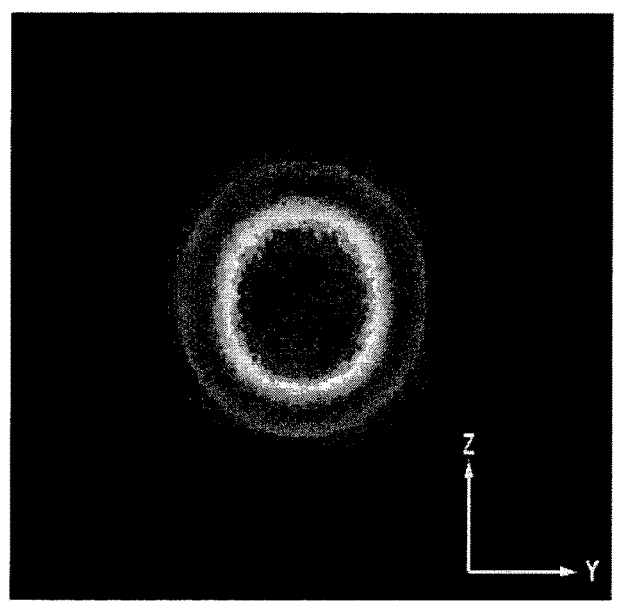
FIG. 27 is an illustration showing the sectional intensity distribution of light that is output from the light-source optical system shown in FIG. 24.

In the configuration shown in FIGS. 23A and 23B, the dimensions of the core 23 are restricted in the Z direction but are widened in the Y direction, as shown in FIGS. 25A and 25B. Thus, the sectional intensity distribution of the light output from the output section 23a becomes elliptical, as shown in FIG. 26. On the other hand, by providing the reflector 27 to converge light at the output section 23a before being output, it is possible to output, from the output section 23a, light having a circular sectional intensity distribution with equal dimensions in the Y and Z directions, as shown in FIG. 27, which facilitates handling of the output light. FIGS. 26 and 27 show images obtained through optical simulation.

As the output light convergence unit, instead of the elliptical arc reflector 27, a pair of parabolic reflectors that are disposed such that the focal point of one is located at the wavelength conversion unit 2 and the focal point of the other is located at the output section 23a may be used.

Figure 28:
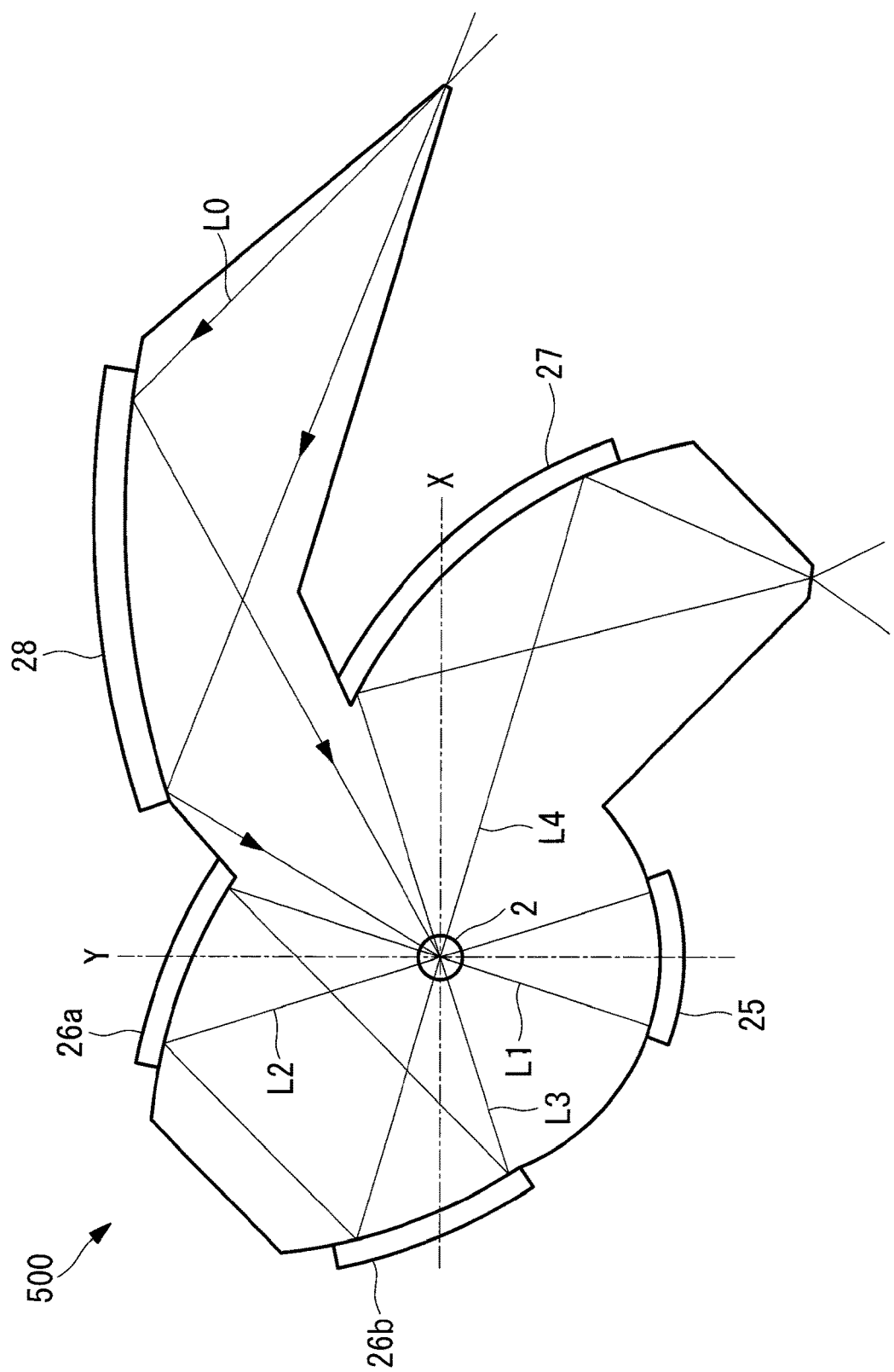
FIG. 28 is an illustration showing the configuration of another modification of the light-source optical system shown in FIG. 23A.

Furthermore, an excitation-light convergence unit for converging the excitation light L0 before irradiating the wavelength conversion unit 2 therewith may be provided on a side face of the waveguide 20, as shown in FIG. 28. For example, the excitation-light convergence unit is constituted of an elliptical arc reflector 28 that is disposed such that the focal point thereof is located at the wavelength conversion unit 2. This makes it possible to also fabricate, together with the light deflection and convergence unit and the waveguide 20, the excitation-light convergence unit for converging the excitation light L0 before irradiating the wavelength conversion unit 2 therewith. Thus, alignment of optical elements for irradiation with the excitation light L0 becomes unnecessary, which further facilitates system configuration. The reflector 28 may be constituted of two reflectors having parabolic shapes in the XY plane.

Furthermore, in this embodiment, a laser diode (LD) may be provided as the light source 1 in the waveguide 20. In this case, the light source 1 is incorporated integrally with the waveguide 20. Furthermore, it is also possible to connect an optical fiber to the output section 23*a*, thereby fabricating a fiber light source in which the entire system from the light source 1 that radiates excitation light to the optical fiber is integrated.

Figure 29:
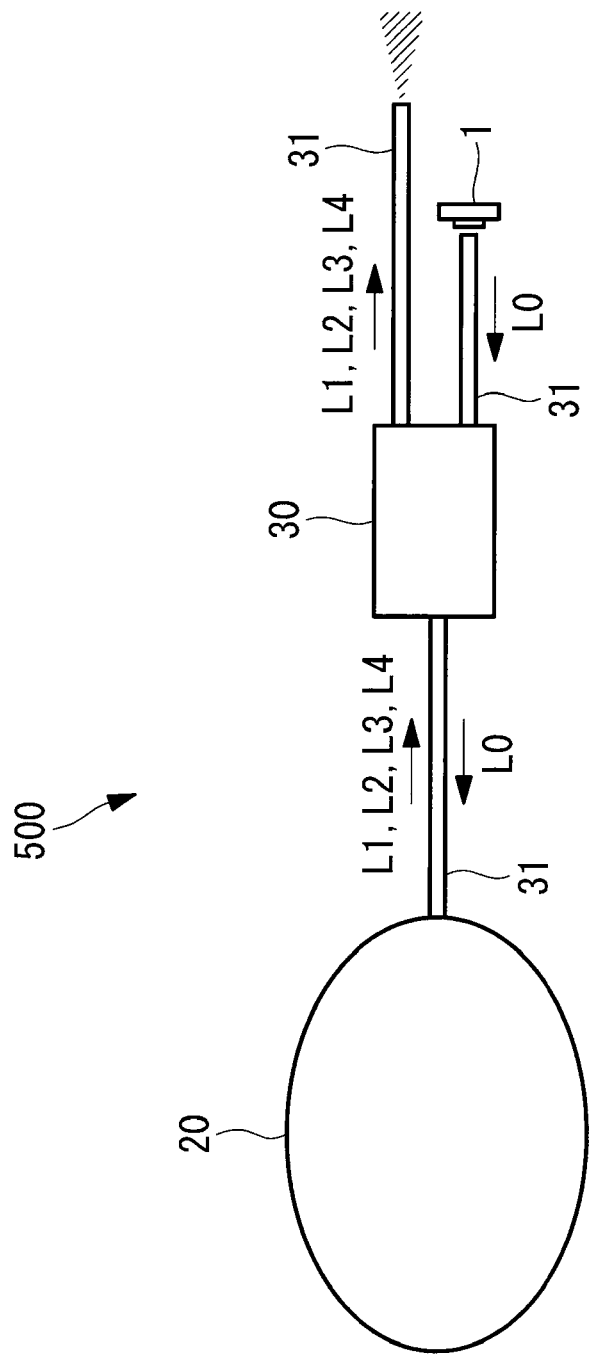
FIG. 29 is an illustration showing the configuration of another modification of the light-source optical system shown in FIG. 23A.

Furthermore, in this embodiment, as shown in FIG. 29, a wavelength splitting element 30 that splits the excitation light L0 and the output light on the basis of wavelengths may be further provided to unify the incident optical path to the waveguide 20 and the exit optical path from the waveguide 20. The reference sign 31 denotes an optical fiber. This makes it possible to reduce the size of the system as a whole. Also in the first to fourth embodiments, in the case where the light radiated from the light-source optical system is fed to an optical fiber after being converged via an optical system, the optical path of the wavelength-converted light and the optical path of the excitation light may be unified by using the wavelength splitting element 30.

Figure 30A:
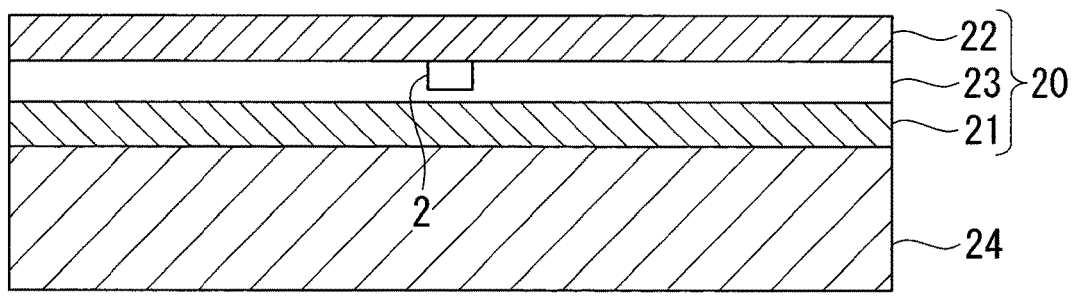
FIG. 30A is a sectional view showing a modification of the wavelength conversion unit, which serves as a partial configuration of the light-source optical system shown in FIG. 23B.
Figure 30B:
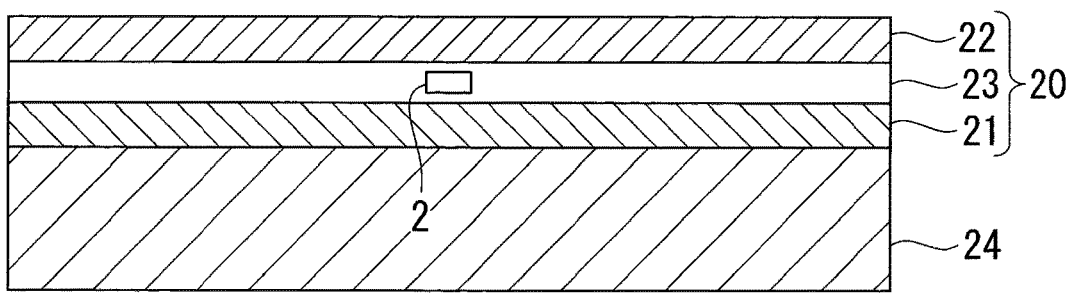
FIG. 30B is a sectional view showing another modification of the wavelength conversion unit, which serves as a partial configuration of the light-source optical system shown in FIG. 23B.
Figure 30C:
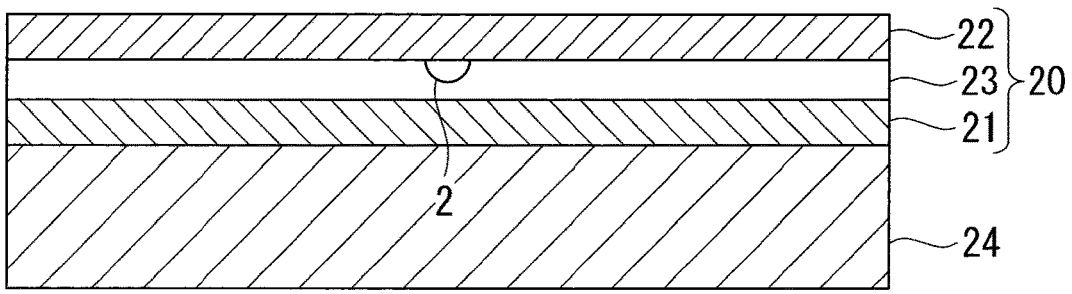
FIG. 30C is a sectional view showing another modification of the wavelength conversion unit, which serves as a partial configuration of the light-source optical system shown in FIG. 23B.

Furthermore, in this embodiment, the thickness of the wavelength conversion unit 2 may be any size less than or equal to the thickness of the core 23. In the case where the thickness of the core 23 and the thickness of the wavelength conversion unit 2 are equal to each other, all the excitation light L0 passes through the wavelength conversion unit 2, so that the absorption rate of the excitation light L0 becomes maximum. Therefore, it is desired that the thickness of the wavelength conversion unit 2 and the thickness of the core 23 be equal to each other. As shown in FIGS. 30A to 30C, when the thickness of the wavelength conversion unit 2 is less than the thickness of the core 23, the absorption rate of the excitation light L0 decreases; however, an advantage is afforded in that it is easy to fabricate a groove structure for encapsulating the material of the wavelength conversion unit 2. On the other hand, in the case where the groove structure for encapsulating the material of the wavelength conversion unit 2 is formed by way of etching or photolithography, fabrication becomes more difficult as the thickness of the core 23 increases.

Sixth Embodiment

Next, a light-source optical system 600 according to a sixth embodiment of the present invention will be described with reference to FIGS. 31 to 34.

Regarding this embodiment, parts that are common with those in the first to fifth embodiments are designated by the same reference signs, and descriptions thereof are omitted.

The light-source optical system 600 according to this embodiment is based on the configuration according to the fourth embodiment, shown in FIG. 18, and includes a waveguide 20, a light deflection and convergence unit, an optical relay unit, and wavelength conversion units 2 and 2' provided in at least two regions of the core 23.

Figure 31:
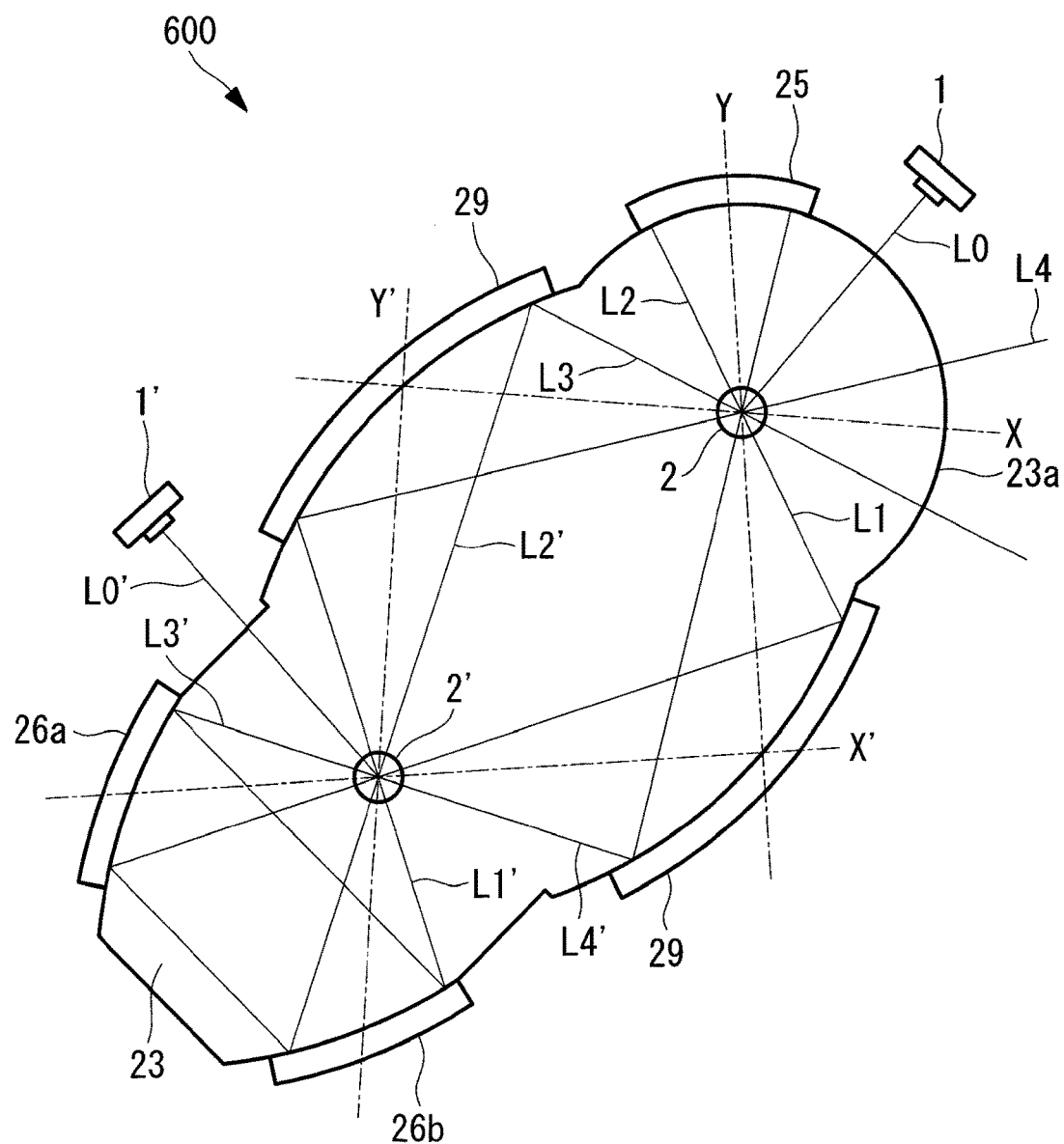
FIG. 31 is a plan view showing the configuration of a light-source optical system according to a sixth embodiment.

FIG. 31 shows an example configuration of the light-source optical system 600. For example, the light deflection and convergence unit includes a circular-arc reflector 25 with the center thereof located at the wavelength conversion unit 2 and a pair of parabolic reflectors 26*a* and 26*b* that are disposed such that the focal points thereof coincide with the center of the wavelength conversion unit 2'.

For example, the optical relay unit is constituted of an elliptical-arc reflector 29 that is disposed such that the focal points thereof coincide with the two wavelength conversion units 2 and 2'. The optical relay unit relays the light beams L1 to L3 and L1' to L4' between the two wavelength conversion units 2 and 2'.

With the thus-configured light-source optical system 600 according to this embodiment, it is possible to mutually overlap, into a single light beam, the at least eight light beams L1 to L4 and L1' to L4' radiated in mutually different directions from the wavelength conversion units 2 and 2' disposed in at least two regions, without increasing the etendue. This makes it possible to output light having even higher luminance. Furthermore, similarly to the fifth embodiment, it is possible to fabricate in an integrated manner the waveguide 20 including the wavelength conversion units 2 and 2', the light deflection and convergence unit 25, 26*a*, and 26*b*, and the optical relay unit 29, so that alignment of optical elements becomes unnecessary. Furthermore, it becomes possible to output light in various colors by using the wavelength conversion units 2 and 2' that generate light having mutually different wavelengths.

Figure 32:
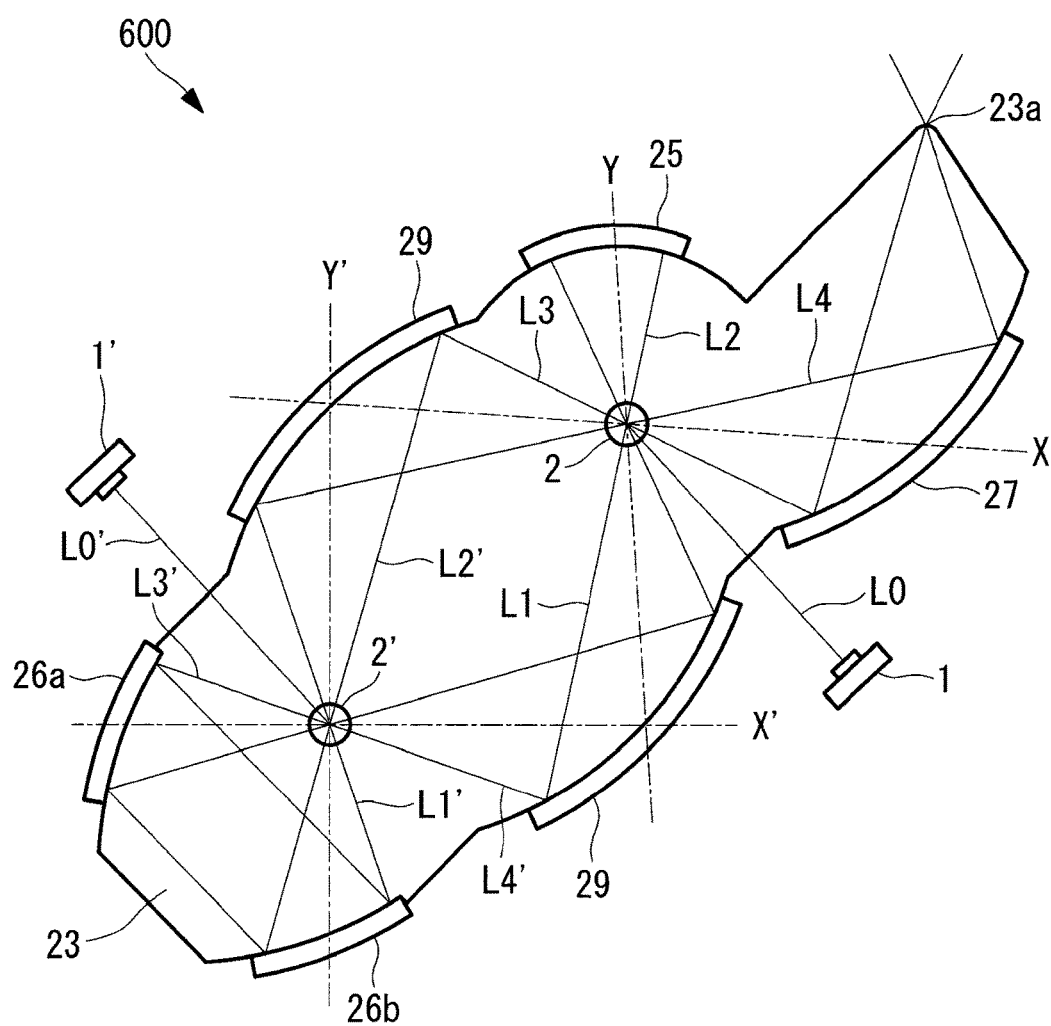
FIG. 32 is an illustration showing the configuration of a modification of the light-source optical system shown in FIG. 31.

In this embodiment, as shown in FIG. 32, the reflector 27 that serves as an output-light convergence unit, described in the context of the fifth embodiment, may be further provided so that the sectional intensity distribution of the light output from the output section 23*a* becomes circular.

Figure 33:
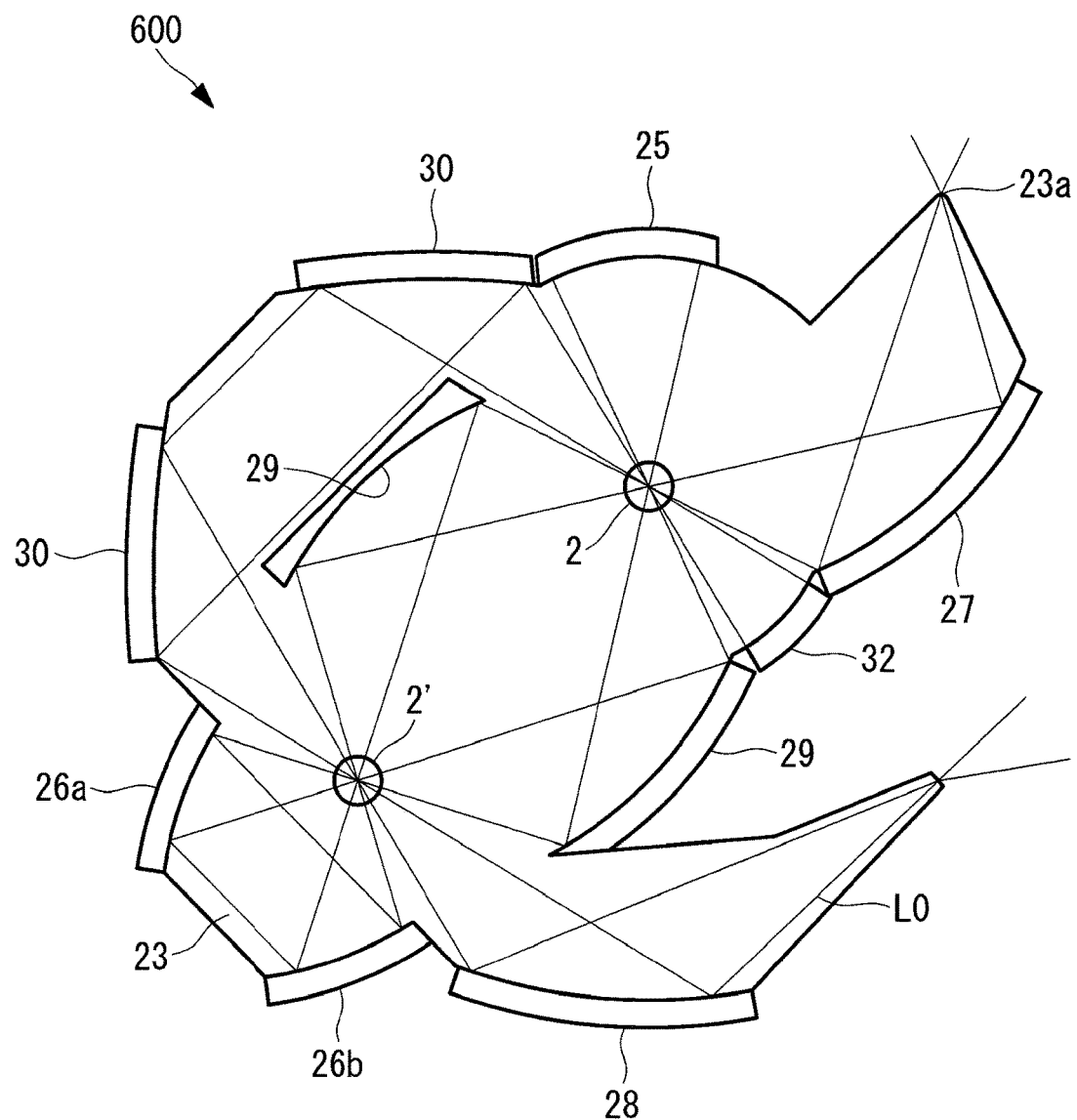
FIG. 33 is an illustration showing the configuration of another modification of the light-source optical system shown in FIG. 31.

Furthermore, the optical-path configuration shown in FIG. 32 may be modified as shown in FIG. 33. Specifically, a reflector 28 that serves as an excitation-light convergence unit for converging the excitation light L0 before irradiating the wavelength conversion unit 2 therewith may be further provided on a side face of the waveguide 20. This makes it possible to fabricate the excitation-light convergence unit together with the waveguide 20 and other parts. In FIG. 33, some reference signs are omitted in order to avoid making the figure complex.

With the optical-path configuration shown in FIG. 33, the excitation light L0 is converged by the reflector 28 and enters the wavelength conversion unit 2'. At this time, the component that passes through the wavelength conversion unit 2' without being subjected to the wavelength conversion by the wavelength conversion unit 2' is converged by a reflector 30 and enters the other wavelength conversion unit 2. Furthermore, the component that has passed through the wavelength conversion unit 2 is reflected by a reflector 32 and re-enters the wavelength conversion unit 2, and a portion of the component further re-enters the wavelength conversion unit 2'. Here, similarly to the reflector 25, the reflector 32 has a circular-arc shape in the XY plane and is disposed such that the circular center thereof coincides with the center of the wavelength conversion unit 2. By designing the optical path such that the excitation light L0 passes through each of the wavelength conversion units 2 and 2' twice, as described above, it is possible to improve the utilization efficiency of the excitation light L0. This configuration is effective in the case where the transmittance of the wavelength conversion unit 2 with respect to the excitation light L0 is high.

Figure 34:
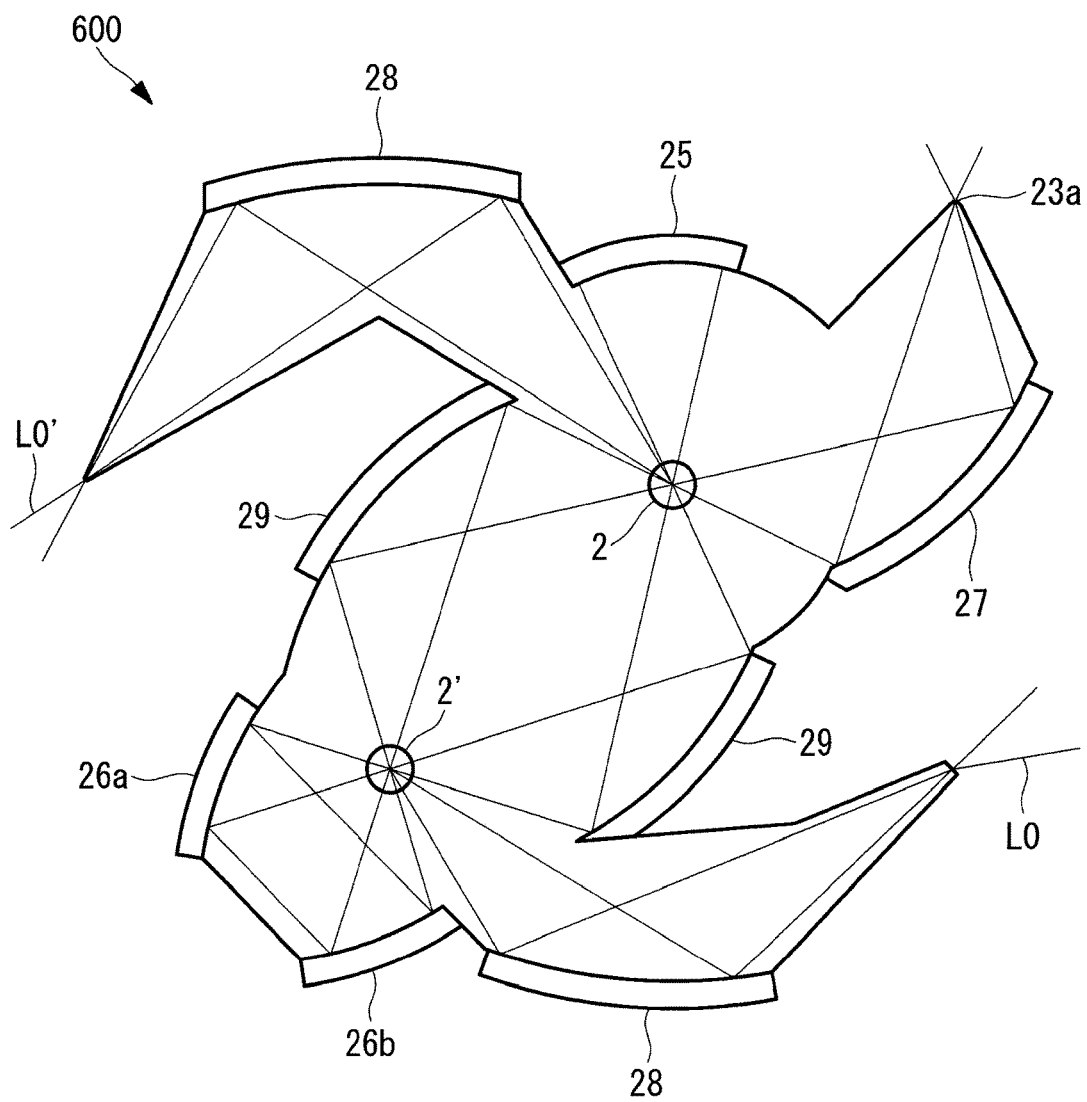
FIG. 34 is an illustration showing the configuration of another modification of the light-source optical system shown in FIG. 31.

Furthermore, in this embodiment, the wavelength conversion units 2 and 2' may be individually excited by using two light sources, as shown in FIG. 34. This configuration is effective in the case where the absorption rates of the wavelength conversion unit 2 with respect to the excitation light L0 and L0' are high, in the case where the wavelengths of the excitation light L0 and L0' for the wavelength converters 2 and 2' vary, etc.

Although FIGS. 31 to 34 show an example including the two wavelength conversion units 2 and 2', the number of wavelength conversion units may be increased to three, four, or more, and the number of optical relay units 29 may be increased accordingly, thereby further increasing the intensity of output light.

Seventh Embodiment

Next, a light-source optical system 700 according to a seventh embodiment of the present invention will be described with reference to FIG. 35.

Regarding this embodiment, parts that are common with those in the first to sixth embodiments are designated by the same reference signs, and descriptions thereof are omitted.

The light-source optical system 700 according to the seventh embodiment of the present invention is based on the configuration according to the fifth embodiment, and the number of light beams that are made to overlap each other is increased to six, eight, or more.

Figure 35:
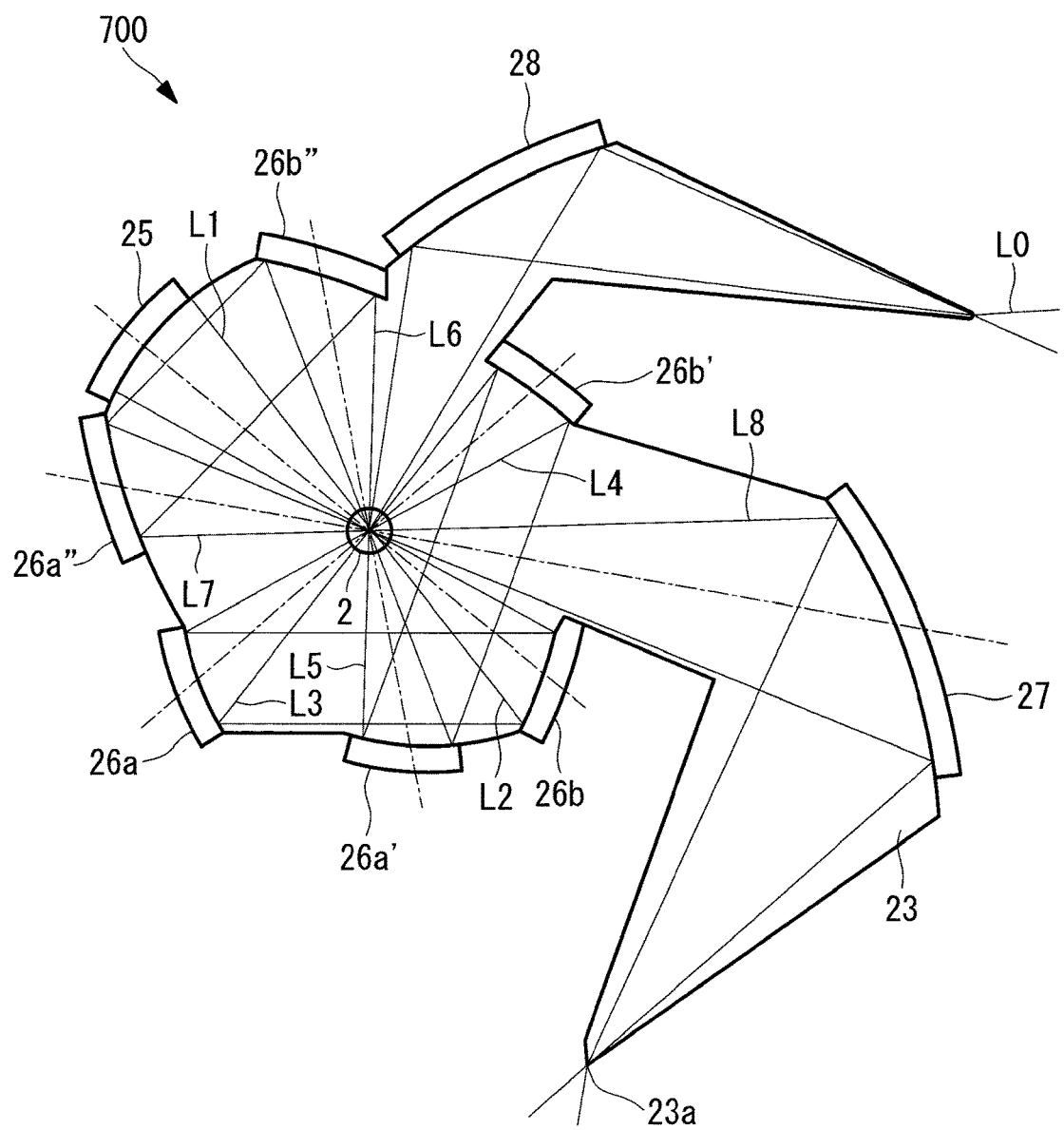
FIG. 35 is a plan view showing the configuration of a light-source optical system according to a seventh embodiment.

FIG. 35 shows an example configuration of the light-source optical system 700. The configuration shown in FIG. 35 is an example in which a total of eight light beams, namely, L1 to L8 radiated from the wavelength conversion unit 2 in mutually different directions, are output in an overlapping fashion as a single light beam. The light deflection and convergence unit includes a circular-arc reflector 25 with the circular center located at the wavelength conversion unit 2 and also includes three pairs of parabolic reflectors 26a and 26b; 26a' and 26b'; and 26a" and 26b" having focal points located at the wavelength conversion unit 2. Furthermore, the reflector 27 that serves as an output-light convergence unit and the reflector 28 that serves as an excitation-light convergence unit, described in the context of the fifth embodiment, are also provided.

With this configuration, it is possible to overlap a total of eight light beams with each other, namely, the light beams L1 to L8 radiated from the wavelength conversion unit 2 in mutually different directions, which makes it possible to output light having an increased intensity without increasing the etendue. This makes it possible to output light having an intensity equivalent to that in the case where the two wavelength conversion units 2 are used, as described in the context of the sixth embodiment. Also, since the single wavelength conversion unit 2 suffices, it becomes possible to reduce the size of the optical system as a whole.

It is to be noted that, in the first to seventh embodiments described above, in order for the wavelength-converted light generated at the centers of the wavelength conversion units 2 and 2' to be radiated efficiently to the outside of the wavelength conversion unit 2, and in order for the wavelength-converted light re-entering the wavelength conversion units 2 and 2' to efficiently pass through the wavelength conversion unit 2, it is necessary that the transmittances of the wavelength conversion units 2 and 2' with respect to the wavelength-converted light be sufficiently high. The following describes the specific transmittances of the wavelength conversion units 2 and 2' with respect to the wavelength-converted light.

By using the configuration of the light-source optical system 100 shown in FIG. 1, in which the number of optical elements constituting the light deflection and convergence unit is the smallest, the lower limit of transmittance of the wavelength conversion unit 2 with respect to wavelength-converted light will be calculated. It is assumed that the spherical mirror 3 and the parabolic mirrors 4a and 4b have silver-coated surfaces having high reflection rates as the reflective surfaces thereof and that the reflection rates are 98%. Furthermore, it is assumed that the transmittance of the wavelength conversion unit 2 with respect to wavelength-converted light is 60%.

The light beam L1 is reflected once by each of the spherical mirror 3 and the parabolic mirrors 4a and 4b and passes through the wavelength conversion unit 2 twice. When the intensity of the light beam L1 when radiated from the wavelength conversion unit 2 is considered to be 1, the intensity of the light beam L1 when output in the positive direction of the X axis is 0.34. The intensity of each of the light beams L2 to L4 when output in the positive direction of the X axis is calculated in a similar manner. Table 1 shows the result of calculating the sum of the intensities of the light beams L1 to L4. If the transmittance of the wavelength conversion unit 2 with respect to wavelength-converted light is not less than 60%, it is possible to attain an intensity of twice or more compared with the case where only a single light beam is output. That is, it is possible to output light having intensity greater than that in the case of a configuration in which light beams that are scattered forward and backward are made to overlap each other, as in Japanese Unexamined Patent Application, Publication No. 2011-142006. From what has been described above, it is desired that the transmittance of the wavelength conversion unit 2 with respect to wavelength-converted light be not less than 60%.

TABLE 1

| Light beam | Intensity |
| --- | --- |
| L1 | 0.34 |
| L2 | 0.58 |
| L3 | 0.20 |
| L4 | 1.00 |
| Total | 2.11 |

Furthermore, the reason that the number of light beams that are radiated from the single wavelength conversion unit 2 and are made to overlap each other is an even number in the first to seventh embodiments is as follows.

Figure 36:
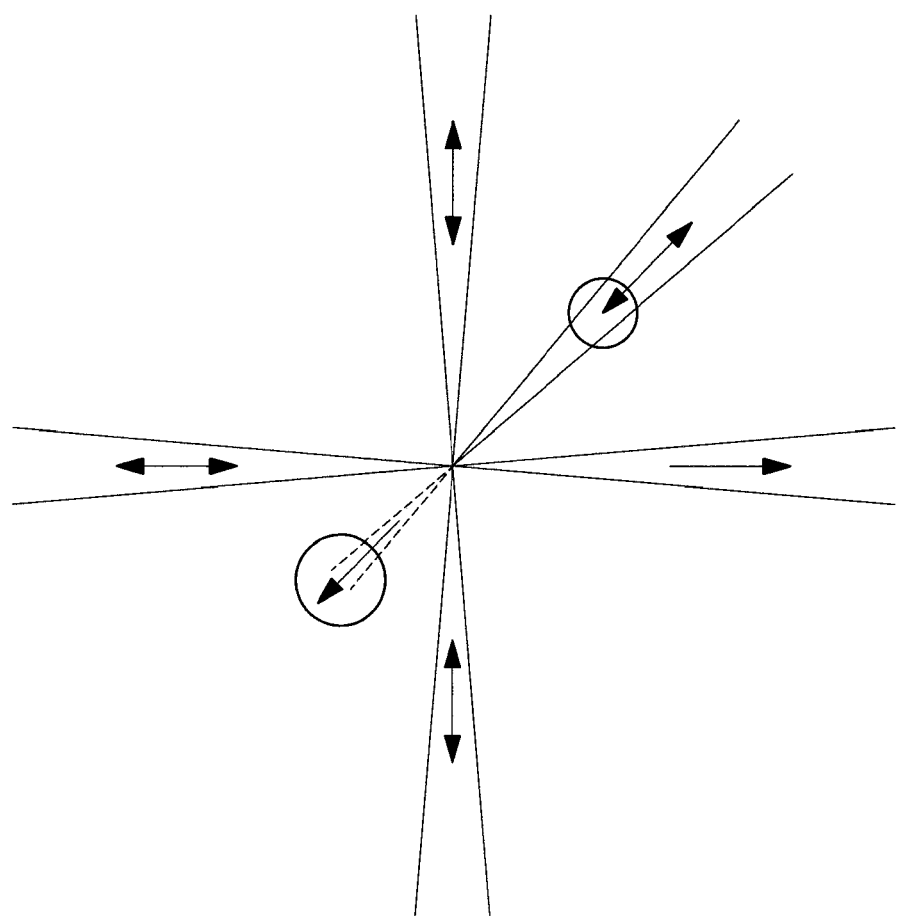
FIG. 36 is an illustration for explaining the reason that the number of light beams made to overlap each other is an even number.

In the optical-path configuration of each of the embodiments, two light beams radiated from the wavelength conversion unit 2 in either direction along an axis passing through the wavelength conversion unit 2 are made to overlap each other, and the number of light beams that are made to overlap in the end is adjusted by increasing the number of such axes. Therefore, the number of light beams that are made to overlap each other in the end always becomes a multiple of 2. In the case where the number of light beams that are made to overlap were an odd number, there is a light beam that is not used as output light after re-entering the wavelength conversion unit 2 (the component surrounded by a circle in the figure) exists, as shown in FIG. 36.

Figure 37A:
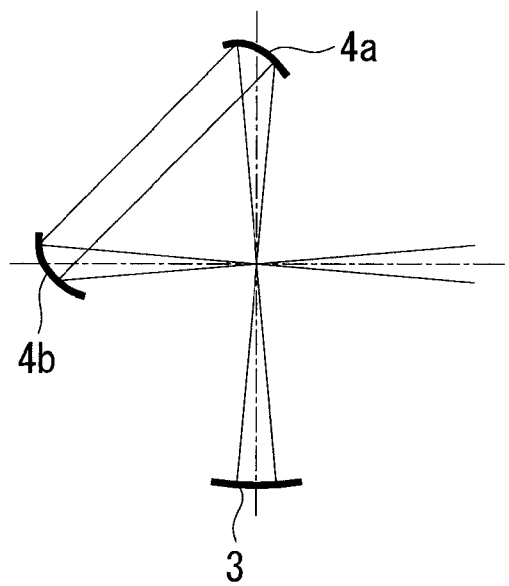
FIG. 37A is an illustration showing an optical system in which four light beams are made to overlap each other by using a combination of a pair of parabolic mirrors and a spherical mirror.
Figure 37B:
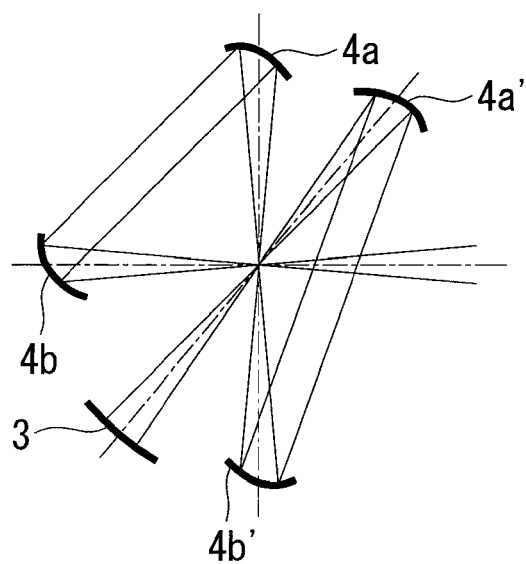
FIG. 37B is an illustration showing an optical system in which six light beams are made to overlap each other by using a combination of a pair of parabolic mirrors and a spherical mirror.
Figure 37C:
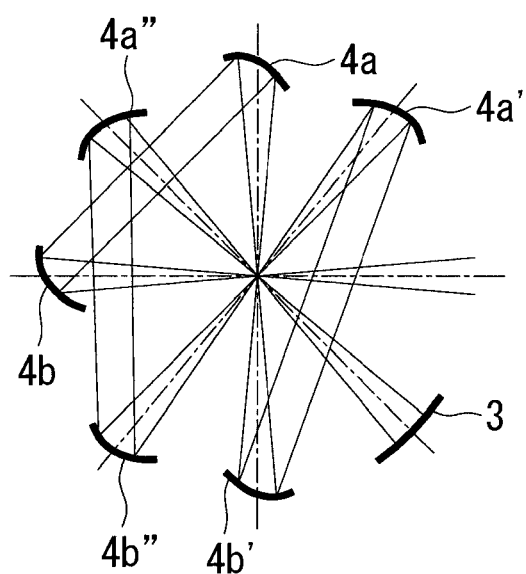
FIG. 37C is an illustration showing an optical system in which eight light beams are made to overlap each other by using a combination of a pair of parabolic mirrors and a spherical mirror.

Furthermore, the reason that the number of light beams that are made to overlap may be an arbitrary even number is that, by using a pair of parabolic mirrors 4a and 4b and one spherical mirror 3, it is possible to relay two light beams and make the light beams overlap other even number of light beams. That is, as shown in FIGS. 37A to 37C, by increasing the number of pairs of parabolic mirrors one by one, i.e., by adding 4a' and 4b' or further adding 4a" and 4b", it is possible to further relay two light beams and make them overlap other light beams. The number of light beams that are made to overlap each other is four in the configuration shown in FIG. 37A, six in the configuration shown in FIG. 37B, and eight in the configuration shown in FIG. 37C.

The idea of making an even number of light beams overlap each other, described above, is applicable regardless of whether or not the light beams lie in the same plane. That is, if intensity loss at the individual optical elements, spaces for disposing the individual optical elements, etc. are disregarded, it is possible to output light beams radiated in all directions from the wavelength conversion unit 2 in an overlapping fashion as a single light beam without increasing the etendue.

Furthermore, what is referred to as a lens in the above description may be replaced with a doublet lens or an optical system constituted of multiple lenses, etc.

Furthermore, in each of the embodiments described above, a mirror may be replaced with a parallel array of mirrors. Even in that case, it is true that an odd number of light beams greater than or equal to three, radiated in mutually different directions, are made to overlap another light beam. It is also true that, as a result, the number of light beams that are made to overlap each other becomes an even number not less than four.

From the above-described embodiments and modifications thereof, the following aspects of the invention are derived.

A first aspect of the present invention is a light-source optical system including a laser light source that radiates excitation light; a wavelength conversion unit that is irradiated with the excitation light from the laser light source to generate light having a wavelength different from that of the excitation light; and a light deflection and convergence unit that causes, of the light generated through the wavelength conversion by the wavelength conversion unit, an odd number of light beams greater than or equal to three, radiated from the wavelength conversion unit in mutually different directions, to converge at and re-enter the wavelength conversion unit from the backward direction of another light beam, radiated from the wavelength conversion unit in a direction different from the directions of the odd number of light beams greater than or equal to three, thereby making the odd number of light beams greater than or equal to three overlap the other light beam, wherein the wavelength conversion unit has a transmittance not less than 60% with respect to the light generated through the wavelength conversion.

According to the first aspect of the present invention, of the light generated through the wavelength conversion by the wavelength conversion unit irradiated with the excitation light from the laser light source, three or more, an add number of light beams radiated in mutually different directions are made to overlap another light beam by the light deflection and convergence unit, so that an even number of light beams greater than or equal to four are output as a single light beam in an overlapping fashion in the end. At this time, the odd number of light beams greater than or equal to three are converged at the wavelength conversion unit and then overlap the other light beam, so that an even number of light beams greater than or equal to four, which are all divergent light beams and have substantially the same shape, overlap each other uniformly.

Since the four or more light beams having substantially the same shape overlap each other, as described above, the divergent angle of the light generated by the light-source optical system is not greater than 90 degrees. Therefore, the etendue of the light generated by the light-source optical system is small, so that it is possible to output light having high luminance. Thus, it is possible to supply light efficiently even to an optical element having a small etendue.

Furthermore, laser light has high luminance, and it is possible to reduce the size of the illumination point by condensing the laser light before irradiating a wavelength conversion material therewith. Accordingly, it is possible to realize a light-source optical system that can output light having even higher luminance by using a laser light source.

Furthermore, since the wavelength conversion unit has a transmittance not less than 60% with respect to the light generated through the wavelength conversion, it is possible to sufficiently reduce intensity loss when the light generated through the wavelength conversion passes through the wavelength conversion unit.

In the first aspect, the light deflection and convergence unit may include a concave mirror disposed such that the focal point thereof is located at the wavelength conversion unit.

By using a concave mirror having the functions of both deflecting and converging light beams as described above, it is possible to reduce the number of parts. Furthermore, with this configuration, since reflection by the concave mirror is utilized as means for deflecting and converging the light generated through the wavelength conversion, an advantage is afforded in that chromatic aberration does not occur.

In the first aspect, the light deflection and convergence unit may include an optical system (converging means) having positive refractive power and disposed such that the focal point thereof is located at the wavelength conversion unit; and a flat mirror (deflecting means) disposed on the opposite side of the wavelength conversion unit with respect to the optical system having the positive refractive power.

With this configuration, since the odd number of light beams greater than or equal to three, radiated from the wavelength conversion unit as divergence light beams, are converted into a collimated beam of light by the optical system having the positive refractive power before being deflected by the flat mirror, it is possible to relax the requirement for the alignment precision of the flat mirror.

In the first aspect, the light deflection and convergence unit may include two optical systems having positive refractive power and disposed in different directions from the wavelength conversion unit such that the focal points thereof are located at the wavelength conversion unit; and a light-guide element that is disposed on the opposite side of the wavelength conversion unit with respect to the two optical systems having the positive refractive power and that guides a light beam that passes through one of the two optical systems having the positive refractive power into the other optical system.

With this configuration, it is possible to arbitrarily modify the optical paths of two light beams in accordance with the shape of the light-guide element. This makes it possible to reduce the size of the system as a whole.

In the first aspect, a dichroic mirror that combines an optical path of the excitation light radiated from the laser light source with an optical path of one of the odd number of light beams greater than or equal to three and the other light beam may be provided.

By unifying the optical path of the light generated through the wavelength conversion and the optical path of the excitation light, it is possible to reduce the size of the system as a whole.

In the first aspect, at least two wavelength conversion units may be provided.

In the first aspect, there may be provided at least two optical circuits each including the laser light source, the wavelength conversion unit, and the light deflection and convergence unit and an optical relay unit that relays the light beams between the at least two optical circuits.

With this configuration, it is possible to increase the number of light beams that are made to overlap each other, thereby outputting light having even higher luminance.

In the first aspect, there may be provided a waveguide that has a substantially flat shape and that guides light, the wavelength conversion unit may be provided inside the waveguide, and the light deflection and convergence unit may be a reflector that is provided on a side face of the waveguide and that reflects the light beams from the wavelength conversion units so that the light beams converge at the wavelength conversion unit.

With this configuration, light beams radiated from the wavelength conversion unit in radial directions substantially along the planar direction of the waveguide are made to re-enter the wavelength conversion unit by the reflector located on the side face of the waveguide. In this case, by forming the waveguide and the reflector as an integrated structure, it is possible to fabricate these elements together by way of an existing semiconductor manufacturing process, which eliminates the need for the alignment between these elements.

In the first aspect, at least two wavelength conversion units of the aforementioned type may be disposed at mutually different positions, and at least one optical relay unit that relays the light beams between the at least two wavelength conversion units may be provided on a side face of the waveguide.

With this configuration, it is possible to increase the number of light beams that are made to overlap each other, thereby outputting light having even higher luminance.

In the first aspect, there may be provided an output-light convergence unit that is provided on the optical axis of the other light beam and that re-converges and outputs the light beams made to overlap each other.

With this configuration, it is possible to circularly shape the sectional intensity distribution of light that is output from the side face of the waveguide.

In the first aspect, there may be provided an excitation-light convergence unit that is disposed at the waveguide and that converges the excitation light from the laser light source before irradiating the wavelength conversion unit therewith.

With this configuration, it is possible to reduce the size of the light emission point while maintaining the intensity of light generated through the wavelength conversion, which makes it possible to output light having high luminance. Furthermore, it is possible to fabricate the excitation-light convergence unit for irradiating the wavelength conversion unit with the excitation light together with the waveguide and the light deflection and convergence unit. This eliminates the need for the alignment among the individual elements.

In the first aspect, the light deflection and convergence unit may converge each of the light beams into a size equal to the size of the light emission point thereof at the time of radiation from the wavelength conversion unit.

With this configuration, it is possible to uniformly overlap and output the light beams radiated from the wavelength conversion unit in mutually different directions, so that it is possible to efficiently input light to a downstream optical element.

In the first aspect, an excitation-light convergence unit that converges the excitation light from the laser light source and irradiates the wavelength conversion unit therewith may be further provided.

With this configuration, it is possible to reduce the size of the emission point of the light generated through the wavelength conversion, thereby increasing luminance.

In the first aspect, at least a portion of the wavelength conversion unit may be held in a central region of a spherical container. Alternatively, in the first aspect, at least a portion of the wavelength conversion unit may be held in a container that is at least partially spherical.

In the first aspect, the material of the wavelength conversion unit may include one of a phosphor and quantum dot that radiates light having a wavelength longer than the wavelength of the excitation light.

With this configuration, as opposed to a lamp light source that emits light by utilizing discharging in gas, there is no need to provide any part that blocks light around the light emission point. Thus, it is possible to efficiently output the light generated through the wavelength conversion by the wavelength conversion unit to the outside of the container, and it is also possible to increase the flexibility of design of the optical system. Furthermore, as opposed to a lamp light source, it is possible to choose the kind of liquid or polymer for dispersing the material of the wavelength conversion unit. Thus, it is possible to reduce the difference in refractive index between the material of the wavelength conversion unit and the material of the container, so that it is possible to reduce the positional deviation between the light emission point and the convergence point at the time of re-entry. Furthermore, in the case of a quantum dot, since it is easy to control the light emission wavelength, it is possible to design a light-source optical system suitable for each application.

In the first aspect, the material of the wavelength conversion unit may be a metal complex that emits light having a wavelength longer than the wavelength of the excitation light.

A second aspect of the present invention is a light-source optical system including a laser light source that radiates excitation light; a wavelength conversion unit that is irradiated with the excitation light from the laser light source to generate light having a wavelength different from that of the excitation light; and a light deflection and convergence unit that causes, of the light generated through the wavelength conversion by the wavelength conversion unit, three or more light beams radiated from the wavelength conversion unit in mutually different directions to converge at and re-enter the wavelength conversion unit from the backward direction of another light beam, radiated from the wavelength conversion unit in a direction different from the directions of the three or more light beams, thereby making the three or more light beams overlap the other light beam to form a single light beam in which each of the at least four light beams overlaps the other at least three light beams, wherein the wavelength conversion unit has a transmittance not less than 60% with respect to the light generated through the wavelength conversion.

A third aspect of the present invention is a fiber light source including any one of the light-source optical systems described above.

A fourth aspect of the present invention is a microscope including any one of the light-source optical systems described above.

A fifth aspect of the present invention is an automotive headlight including any one of the light-source optical systems described above.

REFERENCE SIGNS LIST 1, 1' Light sources
2, 2' Wavelength conversion units
2a Container
3 Spherical mirror (concave mirror, light deflection and convergence unit)
4a, 4b Off-axis parabolic mirrors (concave mirrors, light deflection and convergence unit)
5a to 5d Flat mirrors (light deflection and convergence unit, deflecting means)
5e Flat mirror (combining means)
6a to 6c Convex lenses (optical system having positive refractive power, light deflection and convergence unit, converging means)
6d, 6e Convex lenses
7 Optical fiber (light deflection and convergence unit, deflecting means)
8a, 8b Lens pairs (light deflection and convergence unit, converging means)
9, 9' Dichroic mirrors
10a, 10b Convex lenses (optical relay unit)
12a, 12b Elliptical mirrors (optical relay unit)
13, 14 Reflectors
15 Excitation-light convergence unit
20 Waveguide
21, 22 Claddings
23 Core
24 Substrate
25, 26a, 26b Reflectors (light deflection and convergence unit)
27 Reflector (output-light convergence unit)
28, 32 Reflectors (excitation-light convergence unit)
29 Reflector (optical relay unit)
30 Wavelength splitting element
31 Optical fiber
100, 200, 300, 400, 500, 600, 700 Light-source optical systems
P1, P2 Optical paths formed by light deflection and convergence unit

The invention claimed is:

1. A light-source optical system comprising:
a laser light source that radiates excitation light;
a wavelength conversion unit that is irradiated with the excitation light from the laser light source to generate light having a wavelength different from that of the excitation light; and
a light deflection and convergence unit that causes, of the light generated through the wavelength conversion by the wavelength conversion unit, an odd number of light beams greater than or equal to three, radiated from the wavelength conversion unit in mutually different directions, to converge at and re-enter the wavelength conversion unit from the backward direction of another light beam, radiated from the wavelength conversion unit in a direction different from the directions of the odd number of light beams greater than or equal to three, thereby making the odd number of light beams greater than or equal to three overlap the other light beam,
wherein the wavelength conversion unit has a transmittance not less than 60% with respect to the light generated through the wavelength conversion.

2. The light-source optical system according to claim 1, wherein the light deflection and convergence unit includes a concave mirror disposed such that the focal point thereof is located at the wavelength conversion unit.

3. The light-source optical system according to claim 1, wherein the light deflection and convergence unit includes:
an optical system having positive refractive power and disposed such that the focal point thereof is located at the wavelength conversion unit; and
a flat mirror disposed on the opposite side of the wavelength conversion unit with respect to the optical system having the positive refractive power.

4. The light-source optical system according to claim 1, wherein the light deflection and convergence unit includes:
two optical systems having positive refractive power and disposed in different directions from the wavelength conversion unit such that the focal points thereof are located at the wavelength conversion unit; and
a light-guide element that is disposed on the opposite side of the wavelength conversion unit with respect to the two optical systems having the positive refractive power and that guides a light beam that passes through one of the two optical systems having the positive refractive power into the other optical system.

5. The light-source optical system according to claim 1, further comprising a dichroic mirror that combines an optical path of the excitation light radiated from the laser light source with an optical path of one of the odd number of light beams greater than or equal to three and the other light beam.

6. The light-source optical system according to claim 1, comprising at least two wavelength conversion units.

7. The light-source optical system according to claim 1, comprising:
at least two optical circuits each including the laser light source, the wavelength conversion unit, and the light deflection and convergence unit; and
an optical relay unit that relays the light beams between the at least two optical circuits.

8. The light-source optical system according to claim 1, further comprising a waveguide that has a substantially flat shape and that guides light,
wherein the wavelength conversion unit is provided inside the waveguide, and
the light deflection and convergence unit is a reflector that is provided on a side face of the waveguide and that reflects the light beams from the wavelength conversion units so that the light beams converge at the wavelength conversion unit.

9. The light-source optical system according to claim 8, comprising:
at least two wavelength conversion units that are disposed at mutually different positions; and
at least one optical relay unit that is provided on a side face of the waveguide and that relays the light beams between the at least two wavelength conversion units.

10. The light-source optical system according to claim 8, further comprising an output-light convergence unit that is provided on the optical axis of the other light beam and that re-converges and outputs the light beams made to overlap each other by the light deflection and convergence unit.

11. The light-source optical system according to claim 8, further comprising an excitation-light convergence unit that is disposed at the waveguide and that converges the excitation light from the laser light source and irradiates the wavelength conversion unit therewith.

12. The light-source optical system according to claim 1, wherein the light deflection and convergence unit converges each of the light beams into a size equal to the size of the light emission point thereof at the time of radiation from the wavelength conversion unit.

13. The light-source optical system according to claim 1, further comprising an excitation-light convergence unit that converges the excitation light from the laser light source and irradiates the wavelength conversion unit therewith.

14. The light-source optical system according to claim 1, wherein at least a portion of the wavelength conversion unit is held in a central region of a spherical container.

15. The light-source optical system according to claim 1, wherein at least a portion of the wavelength conversion unit is held in a container that is at least partially spherical.

16. The light-source optical system according to claim 1, wherein the material of the wavelength conversion unit includes one of a phosphor and quantum dot that radiates light having a wavelength longer than the wavelength of the excitation light.

17. The light-source optical system according to claim 1, wherein the material of the wavelength conversion unit is a metal complex that emits light having a wavelength longer than the wavelength of the excitation light.

18. A light-source optical system comprising:
a laser light source that radiates excitation light;
a wavelength conversion unit that is irradiated with the excitation light from the laser light source to generate light having a wavelength different from that of the excitation light; and
a light deflection and convergence unit that causes, of the light generated through the wavelength conversion by the wavelength conversion unit, three or more light beams radiated from the wavelength conversion unit in mutually different directions to converge at and re-enter the wavelength conversion unit from the backward direction of another light beam, radiated from the wavelength conversion unit in a direction different from the directions of the three or more light beams, thereby making the three or more light beams overlap the other light beam to form a single light beam in which each of the at least four light beams overlaps the other at least three light beams,
wherein the wavelength conversion unit has a transmittance not less than 60% with respect to the light generated through the wavelength conversion.

19. A fiber light source comprising:
the light-source optical system according to claim 1; and
a light-guide fiber that guides the light beams radiated from the light-source optical system.

20. A microscope comprising the light-source optical system according to claim 1.

21. An automotive headlight comprising the light-source optical system according to claim 1.

22. A fiber light source comprising:
the light-source optical system according to claim 18; and
a light-guide fiber that guides the light beams radiated from the light-source optical system.

23. A microscope comprising the light-source optical system according to claim 18.

24. An automotive headlight comprising the light-source optical system according to claim 18.

* * * * *